US008655712B2

(12) United States Patent
McMahon

(10) Patent No.: US 8,655,712 B2
(45) Date of Patent: Feb. 18, 2014

(54) IDENTITY MANAGEMENT SYSTEM AND METHOD

(75) Inventor: Piers Victor McMahon, New York, NY (US)

(73) Assignee: CA, Inc., Islandia, NY (US)

( * ) Notice: Subject to any disclaimer, the term of this patent is extended or adjusted under 35 U.S.C. 154(b) by 2777 days.

(21) Appl. No.: 11/397,540

(22) Filed: Apr. 3, 2006

(65) Prior Publication Data

US 2007/0233531 A1  Oct. 4, 2007

(51) Int. Cl.
*G06Q 10/00* (2012.01)

(52) U.S. Cl.
USPC .................. 705/7.37; 705/7.11; 705/7.36

(58) Field of Classification Search
USPC .................... 705/7, 7.11, 7.36, 7.37
See application file for complete search history.

(56) References Cited

U.S. PATENT DOCUMENTS

| | | | | |
|---|---|---|---|---|
| 6,853,974 | B1 * | 2/2005 | Akifuji et al. | 705/9 |
| 2004/0059953 | A1 | 3/2004 | Purnell | 726/6 |
| 2004/0128541 | A1 | 7/2004 | Blakley et al. | 726/9 |
| 2004/0139081 | A1 * | 7/2004 | Barrett et al. | 707/100 |
| 2004/0162786 | A1 | 8/2004 | Cross et al. | 705/59 |
| 2004/0225669 | A1 | 11/2004 | Isaacson et al. | 707/101 |
| 2004/0260651 | A1 * | 12/2004 | Chan et al. | 705/50 |
| 2005/0010547 | A1 | 1/2005 | Carinci et al. | 707/1 |
| 2005/0044423 | A1 * | 2/2005 | Mellmer et al. | 713/201 |
| 2005/0060572 | A1 | 3/2005 | Kung et al. | 726/4 |
| 2005/0086244 | A1 | 4/2005 | Morinville | 707/100 |
| 2005/0091529 | A1 | 4/2005 | Manion et al. | 726/4 |
| 2005/0096932 | A1 | 5/2005 | Fernandez et al. | 705/1 |
| 2005/0111709 | A1 | 5/2005 | Topping | 382/124 |
| 2005/0114701 | A1 | 5/2005 | Atkins et al. | 726/4 |
| 2005/0125509 | A1 | 6/2005 | Ramachandran | 709/220 |
| 2005/0137981 | A1 | 6/2005 | Maes | 705/44 |
| 2005/0164704 | A1 | 7/2005 | Winsor | 455/432.3 |

OTHER PUBLICATIONS

Integrated Manufacturing Modeling System—By Engelke et al. IBM J. Res. Development vol. 29 No. 4 Jul. 1985.*
Computer Associates; White Paper; eTrust Identity and Access Management Suite; Anne Cheney; 17 pages, Feb. 2004.
Computer Associates; White Paper; eTrust Directory Foundation for Online Services; Rick Harvey and Diana Kelley; 8 pages, Apr. 2004.
Computer Associates; White Paper; Moving Beyond Information Life Cycle Management; Stephen Widen, Product Marketing Manager; 9 pages, Jun. 2004.
Liberty Alliance Project; Introduction to the Liberty Alliance Identity Architecture; Revision 1.0; Abstract; 14 pages, Mar. 2003.

(Continued)

*Primary Examiner* — Andre Boyce
*Assistant Examiner* — Ernest A Jackson
(74) *Attorney, Agent, or Firm* — Baker Botts, LLP

(57) ABSTRACT

According to one embodiment, a method for implementing an identity management system for an organization includes developing a process flow diagram, the process flow diagram including one or more icons representing at least one process step for each of the events included in an event group and one or more icons representing at least one process step for each of the functional entities in an entity group, and implementing at least one of the process steps represented in the process flow diagram. The event group includes a status change for a system user, a request for an audit report, and an implementation of a new software application. The entity group includes a human resources department, an information technologies department, and a facilities department.

36 Claims, 29 Drawing Sheets

(56) References Cited

OTHER PUBLICATIONS

International Standard; ISO/IEC 17799; Second Edition; Information Technology—Security Techniques—Code of Practice for Information Security Management; 128 pages, Jun. 15, 2005.

Carnegie Mellon Software Engineering Institute; Pittsburgh, PA 15213-3890; Capability Maturity Model Integration (CMMI) Overview; 58 pages, 2005.

Patent Pending Application entitled "Identity Management Maturity System and Method" by Piers Victor McMahon, 97 pages including drawings, filing date Apr. 3, 2006.

* cited by examiner

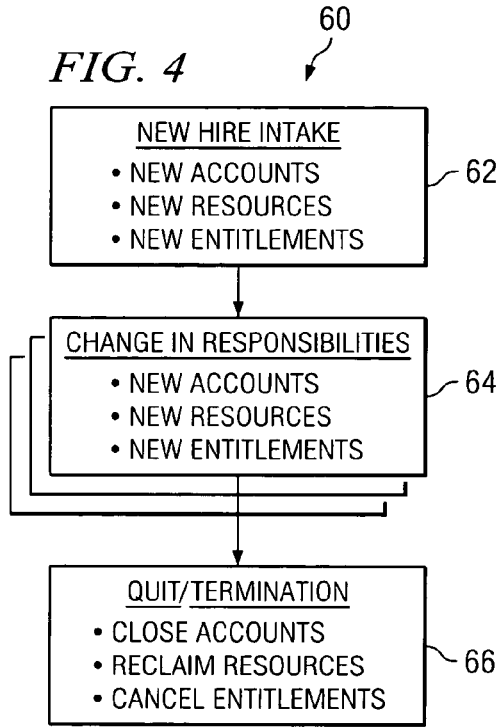
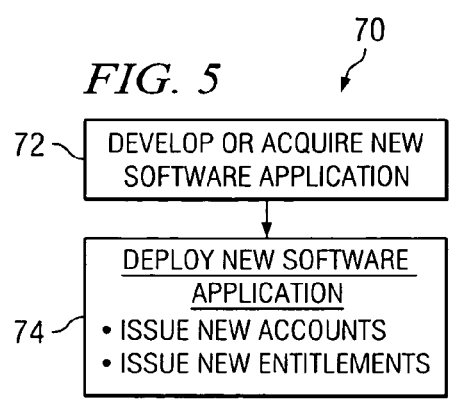
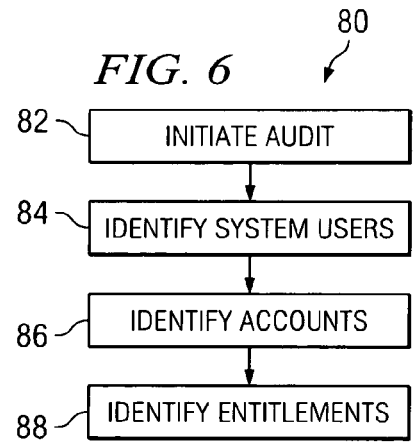
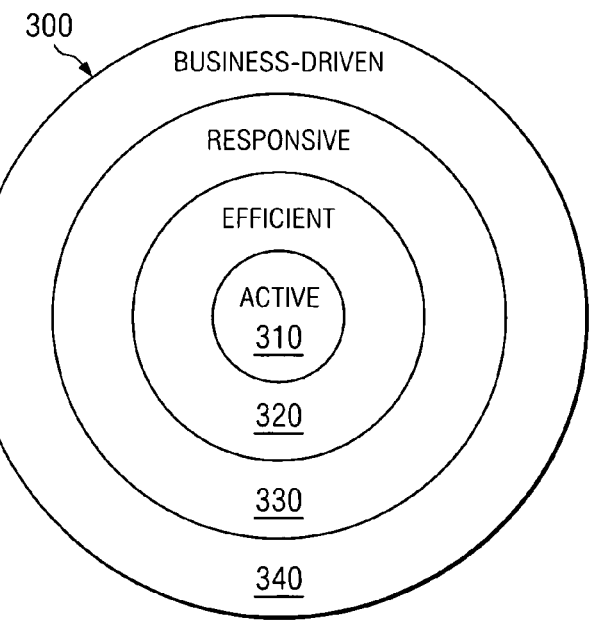

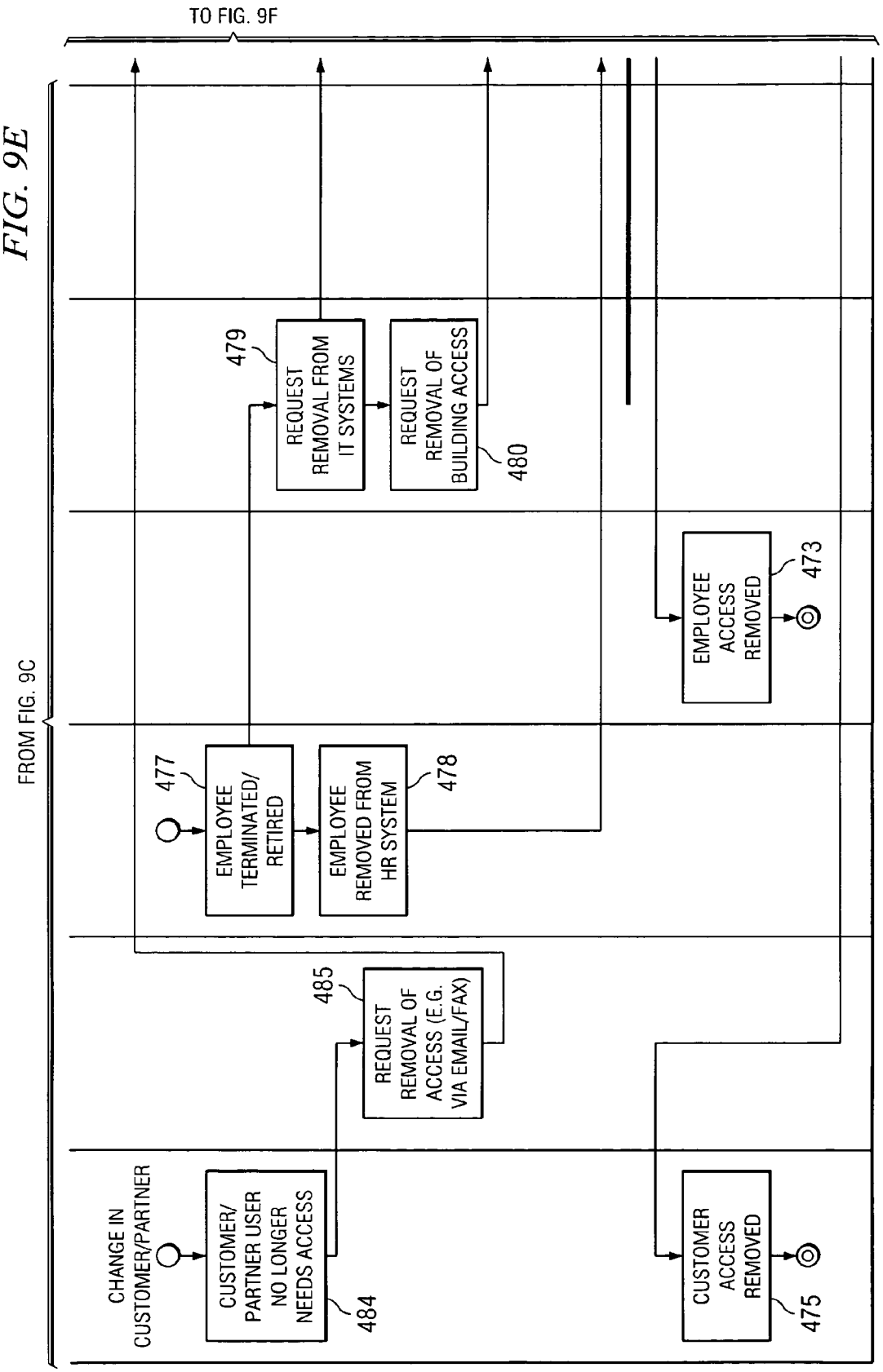

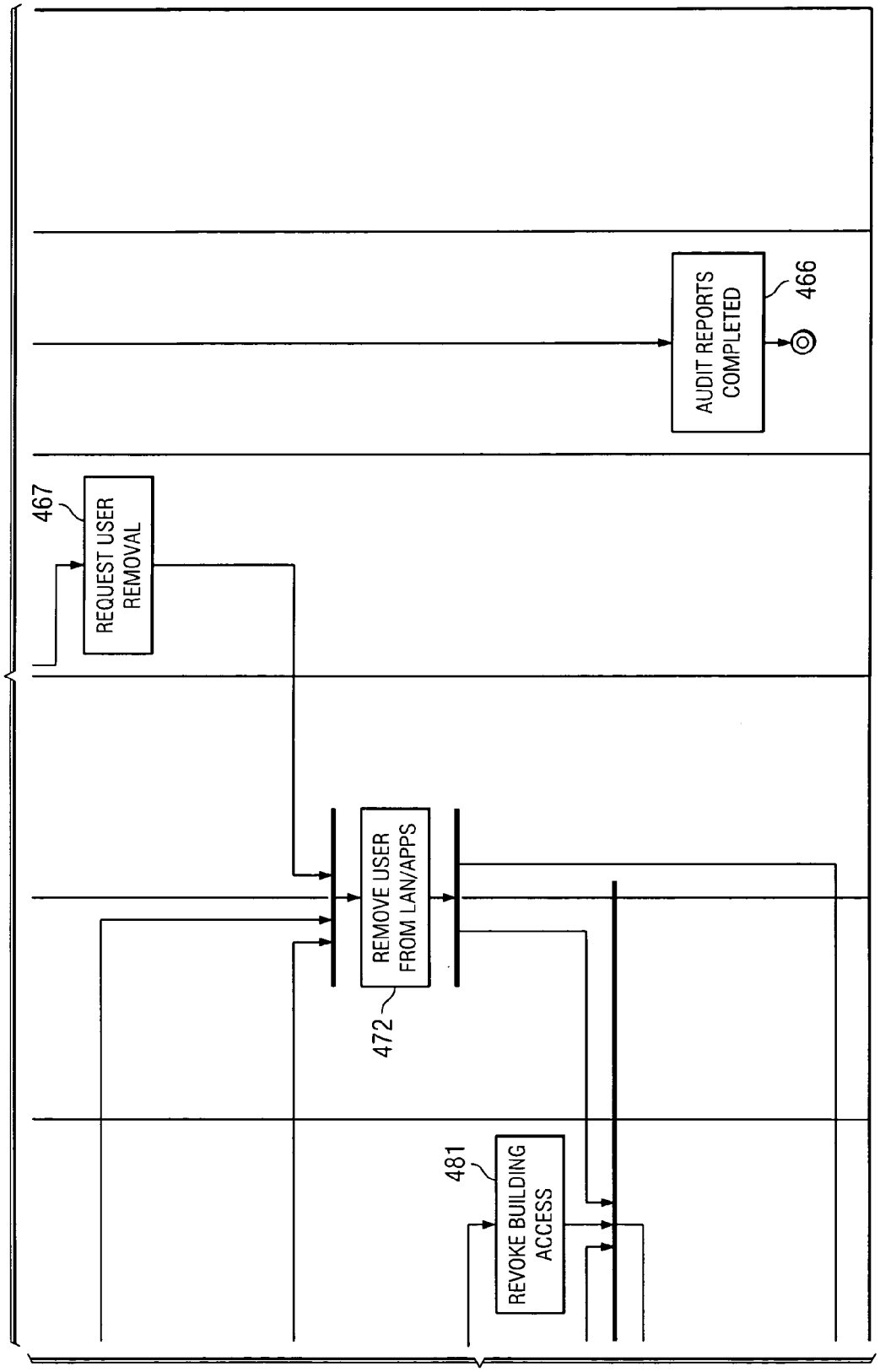

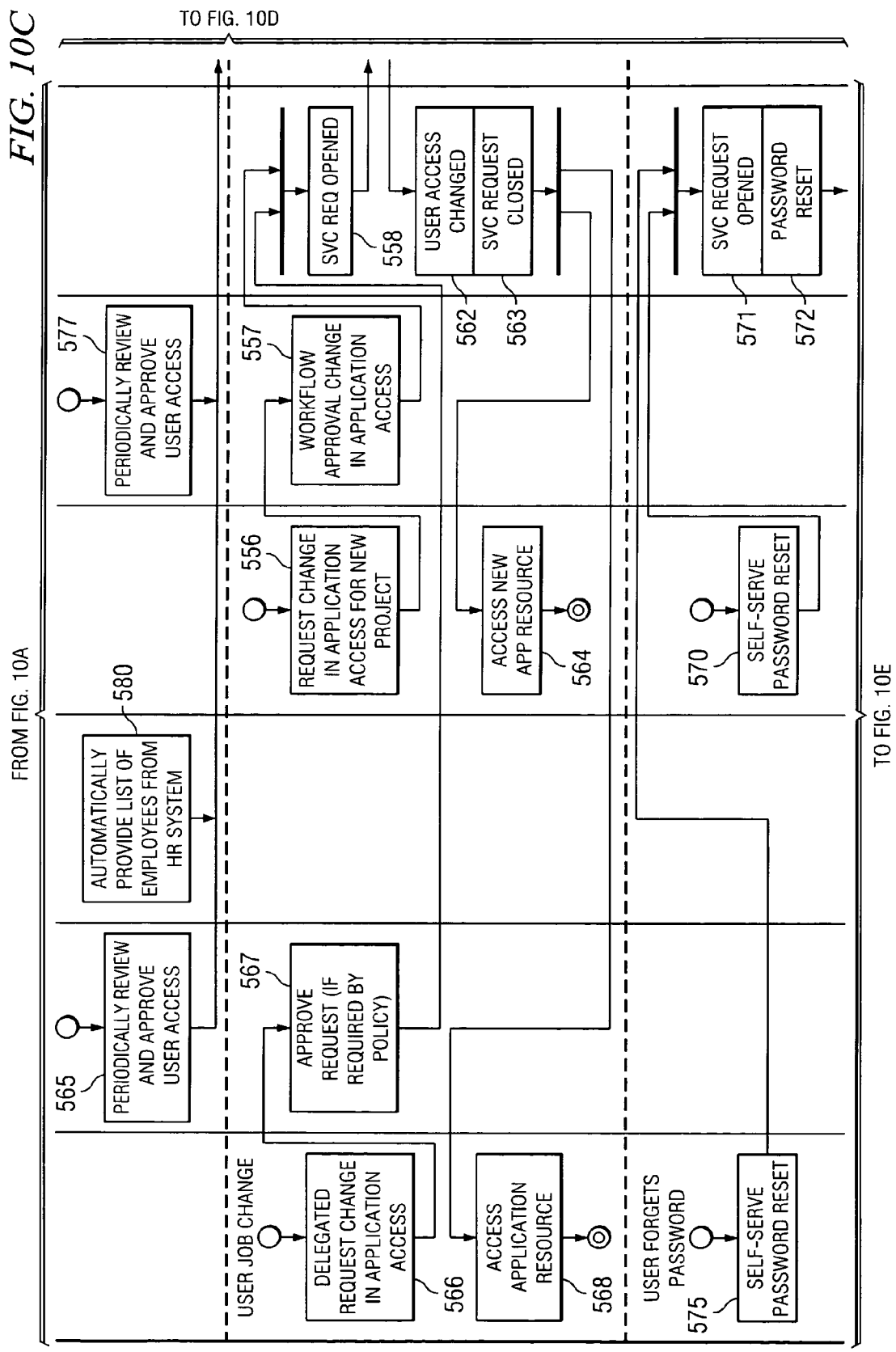

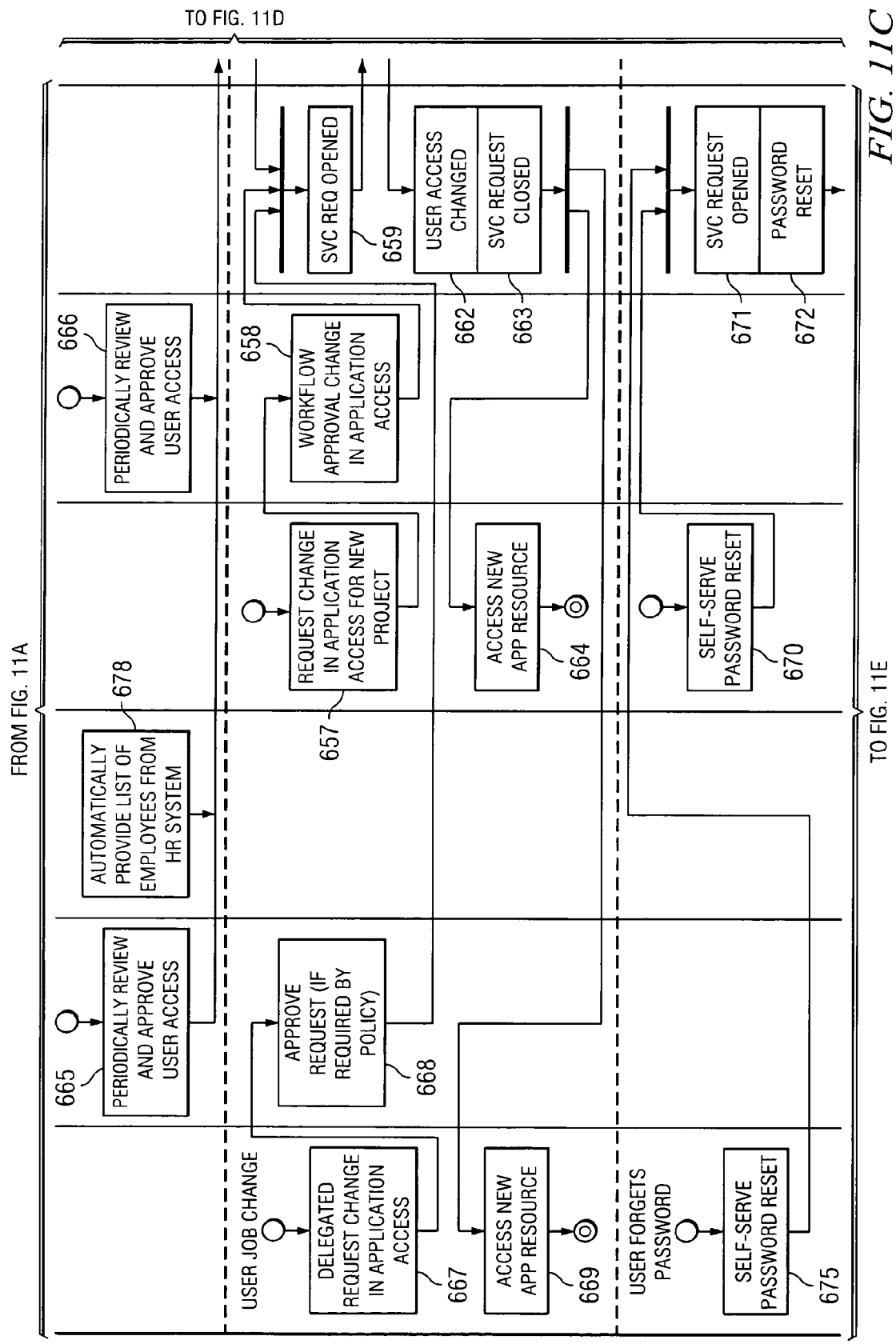

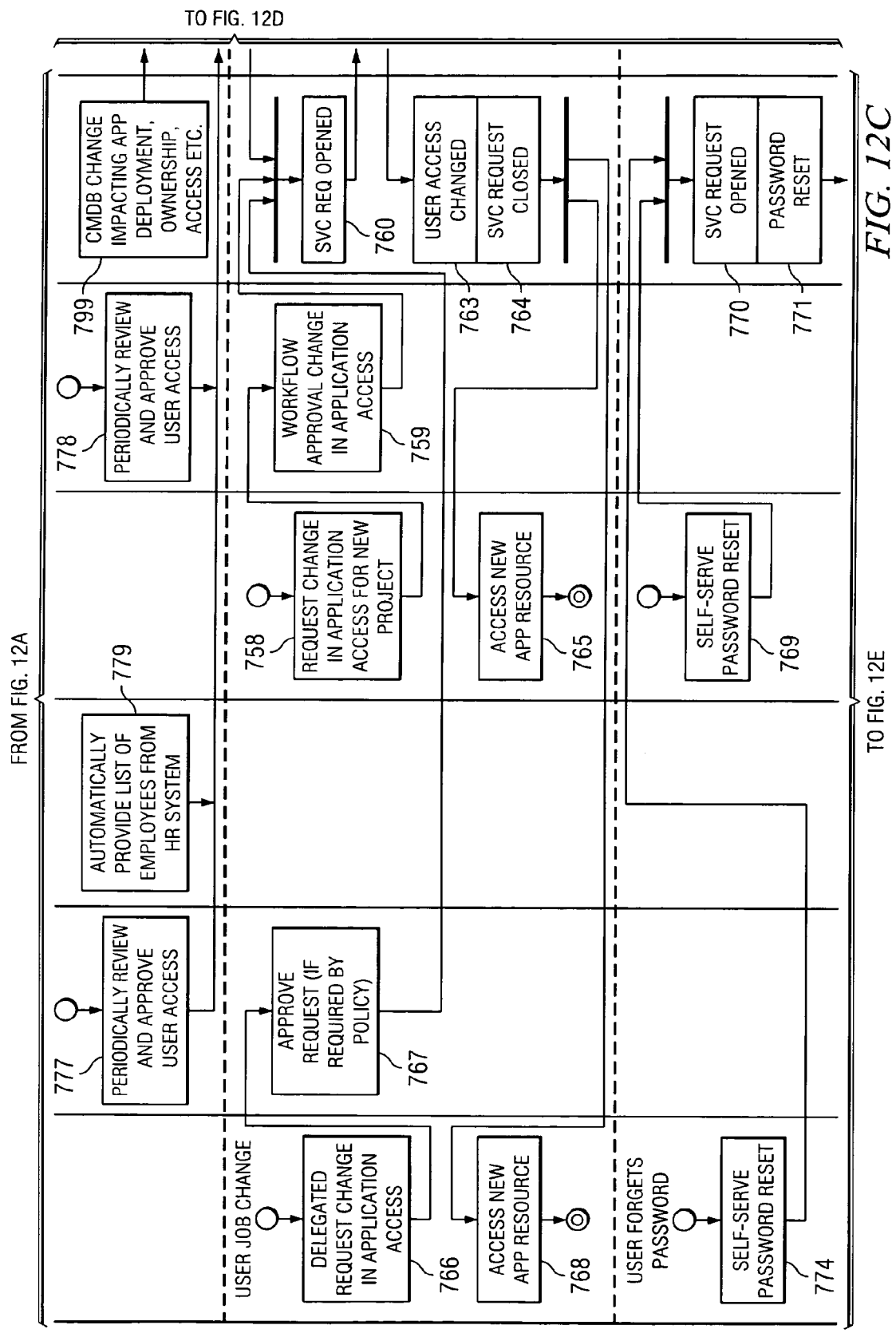

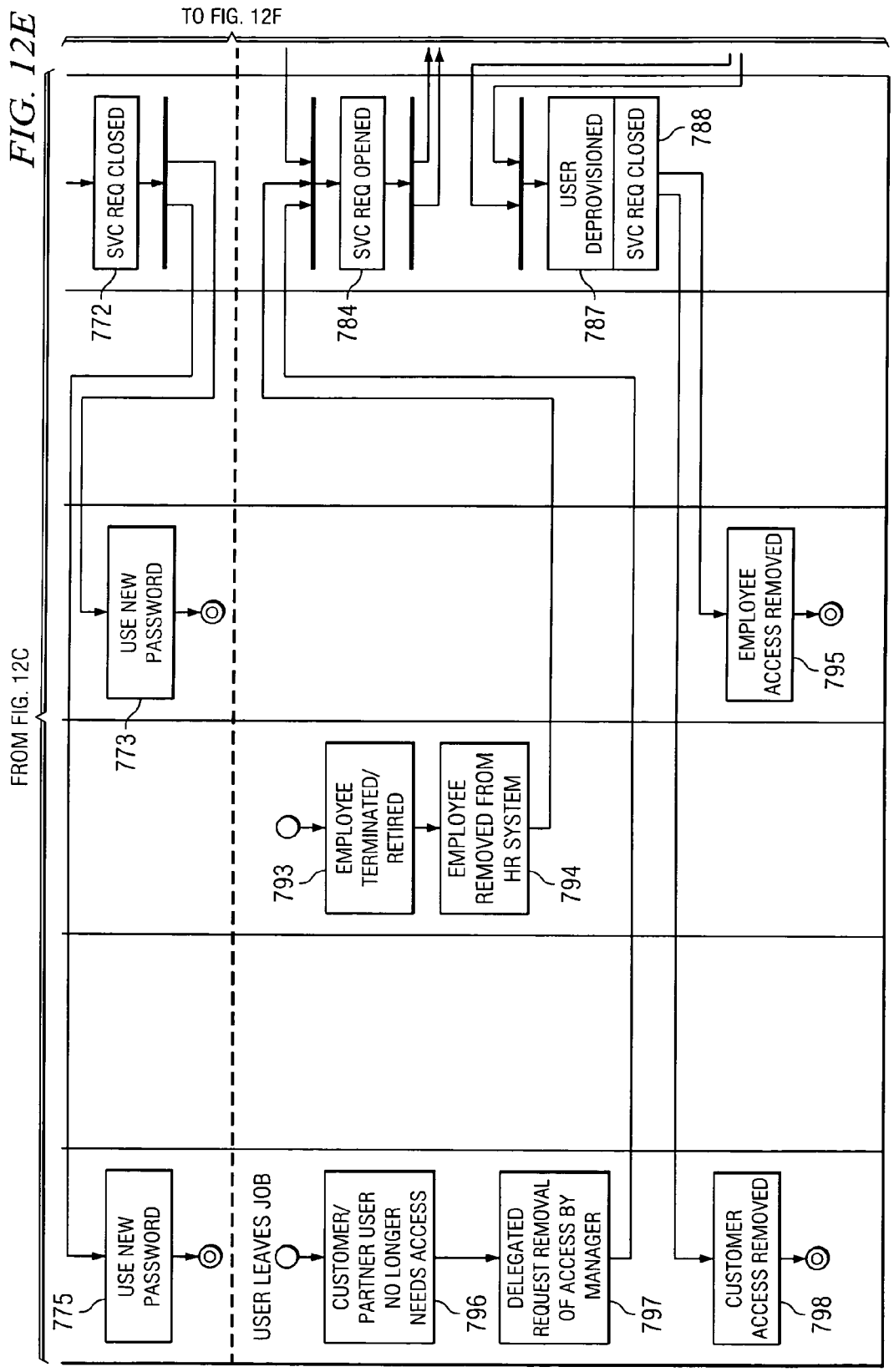

IDENTITY MANAGEMENT SYSTEM AND METHOD

TECHNICAL FIELD OF THE INVENTION

This invention relates generally to identity management and more specifically to an identity management system and method.

BACKGROUND OF THE INVENTION

Organizations are attempting to increase their accessibility to employees, customers, partners, vendors, and suppliers. The need for this increased accessibility may be driven by globalization, efforts to achieve real-time customer relationship management, changing regulatory environments, increasing pressure to reduce supply chain inefficiencies, and/or demands by business partners. To meet these goals, an increasing number of applications are being developed both internally and by application vendors. However, many applications do not have sufficient security, identity management, or auditing features. Those applications that do have these features often provide incompatible security models, inconsistent identity management provisions, and varying auditing mechanisms. These inadequacies and inconsistencies may lead to inefficiency, unauthorized access, or failure to comply with one or more regulations.

SUMMARY

According to one embodiment, a method for implementing an identity management system for an organization includes developing a process flow diagram. The process flow diagram includes one or more icons representing at least one process step for each of the events included in an event group and one or more icons representing at least one process step for each of the functional entities in an entity group. The method also includes implementing at least one of the process steps represented in the process flow diagram. The event group includes a status change for a system user, a request for an audit report, and an implementation of a new software application. The entity group includes a human resources department, an information technologies department, and a facilities department.

Certain embodiments of the present invention may provide various technical advantages. For example, certain embodiments may provide an organization, or a functional entity within an organization, with tools to manage an identity management system through various events cycles. As another example, certain embodiments may provide an automated, or partially automated, system for managing the processes required to implement an identity management system. As yet another example, certain embodiments of the present invention may provide targets, or milestones, in the development of an improved identity management system facilitating such improvements.

Other technical advantages of the present invention will be readily apparent to one of skill in the art from the following figures, descriptions, and claims. Moreover, while specific advantages have been identified above, various embodiments may include some, none, or all of the identified advantages.

BRIEF DESCRIPTION OF THE FIGURES

For a more complete understanding of the present invention and its advantages, reference is now made to the following description, taken in conjunction with the accompanying drawings, in which:

FIG. 4 is a flow diagram illustrating example elements of an employee life cycle;

FIG. 5 is a flow diagram illustrating example elements of a software implementation cycle;

FIG. 6 is a flow diagram illustrating example elements of an audit cycle;

FIG. 8 is a diagram illustrating example elements of an identity management maturity model, according to particular embodiments;

FIGS. 9A-9F provide an example graphical tool, illustrating certain aspects of an example active identity management system, according to particular embodiments;

FIGS. 10A-10F provide an example graphical tool, illustrating certain aspects of an example efficient identity management system, according to particular embodiments;

FIGS. 11A-11F provide an example graphical tool, illustrating certain aspects of an example responsive identity management system, according to particular embodiments;

FIGS. 12A-12F provide an example graphical tool, illustrating certain aspects of an example business-driven identity management system, according to particular embodiments.

DETAILED DESCRIPTION OF EXAMPLE EMBODIMENTS

Embodiments of the present invention and its advantages are best understood by referring to FIGS. 1 through 13 of the drawings, like numerals being used for like and corresponding parts of the various drawings. However, it should be understood at the outset that although example implementations of embodiments of the invention are illustrated below, the present invention may be implemented using any number of techniques, whether currently known or not. The present invention should in no way be limited to the example implementations, drawings, and techniques illustrated below.

Figure 1A:
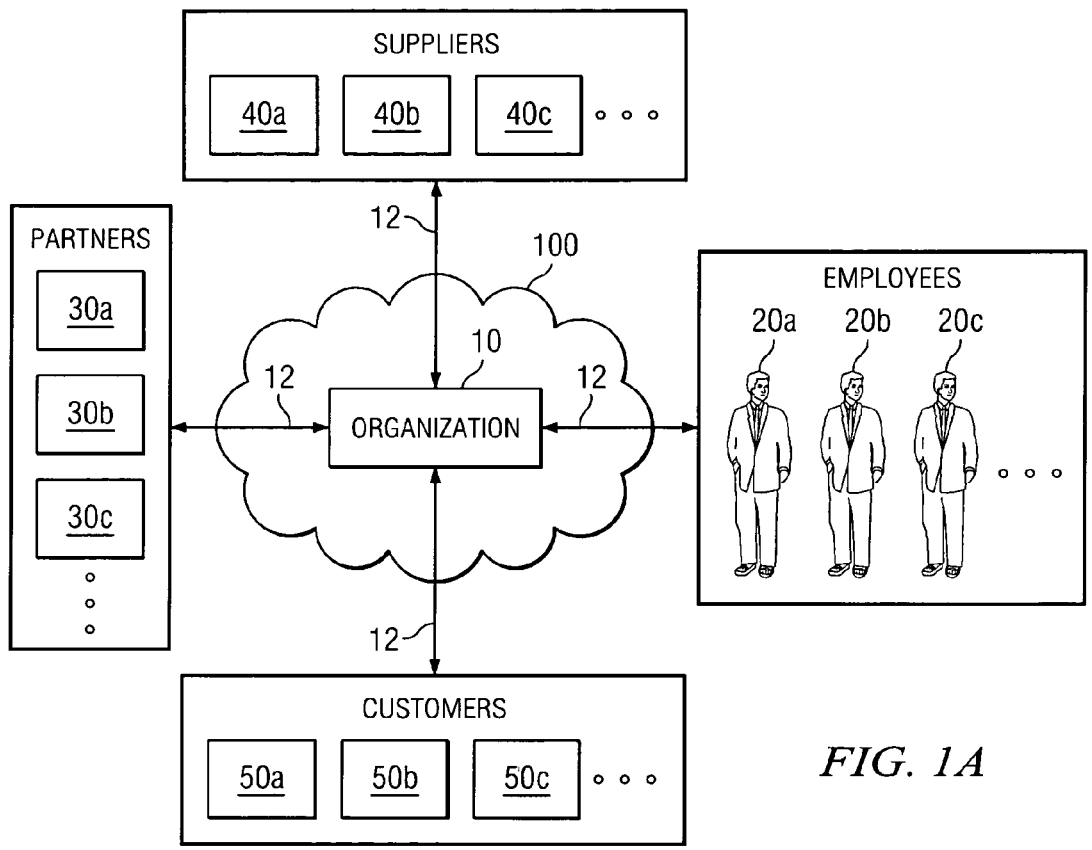
FIG. 1A is a block diagram illustrating an organization with example relationships and an example identity management system, according to particular embodiments.

FIG. 1A is a block diagram illustrating an organization 10 with example relationships 12 and an example identity management system 100, according to particular embodiments. As shown, organization 10 has relationships 12 with employees 20, partners 30, suppliers 40, and customers 50. In certain embodiments, organization 10 may have some, none, or all of these relationships and, in alternative embodiments, organization 10 may have additional relationships not illustrated in FIG. 1A.

Employees 20 may represent individual employees, groups of employees, contractors, and/or any other appropriate entity employed by organization 10. Partners 30 broadly represent individuals and/or entities having non-supply-chain business relationships with organization 10. Suppliers 40 broadly represent individuals and/or entities having supply-side supply-chain relationships with organization 10, supplying products, goods, information, and/or other resources to organization 10. Customers 50 broadly represent individuals and/or entities having demand-side supply-chain relationships with organization 10, receiving products, goods, information, etc. from organization 10.

In certain embodiments, organization 10 may need and/or desire to provide physical and/or electronic access to one or more of the employees 20, partners 30, suppliers 40, and customers 50 for various purposes. In certain embodiments, to provide this access, organization 10 may generate identities and/or entitlements for one or more of these employees 20, partners 30, suppliers 40, and customers 50.

In certain embodiments, an identity may represent a means for verifying a system user. In certain embodiments, an identity may be associated with attributes that the system user may provide to authenticate themselves, such as a pass code or a set of numbers such as an encryption key. For example, one form of identity may be a user account associated with one or more applications. In certain embodiments, a single system user may have a plurality of identities for use with varying applications, data sources, etc. In certain embodiments, each identity may have one or more entitlements, with each entitlement providing access to one or more applications, data sources, etc. In certain embodiments, a single system user may have multiple identities each having different entitlements for a single application. For example, a system user may have a first identity with a low level entitlement for using an application and a second identity with a higher level entitlement for modifying and/or updating the application. In certain embodiments, the system user having these identities and entitlements may be an employee 20, a group of employees 20, a partner 30, a supplier 40, a customer 50, and/or any other appropriate individual and/or entity that has been provided access by one or more functional entities. In certain embodiments, a functional entity may represent an individual, a department or other business unit within organization 10, a vendor or other entity external to organization 10, a software application, etc.

In certain embodiments, the generation of and/or management of identities and/or entitlements may be performed by identity management system 100. In certain embodiments, identity management system 100 may broadly represent the procedures, software and/or other tools utilized by organization 10 to manage the identities and/or entitlements of the various system users.

Figure 1B:
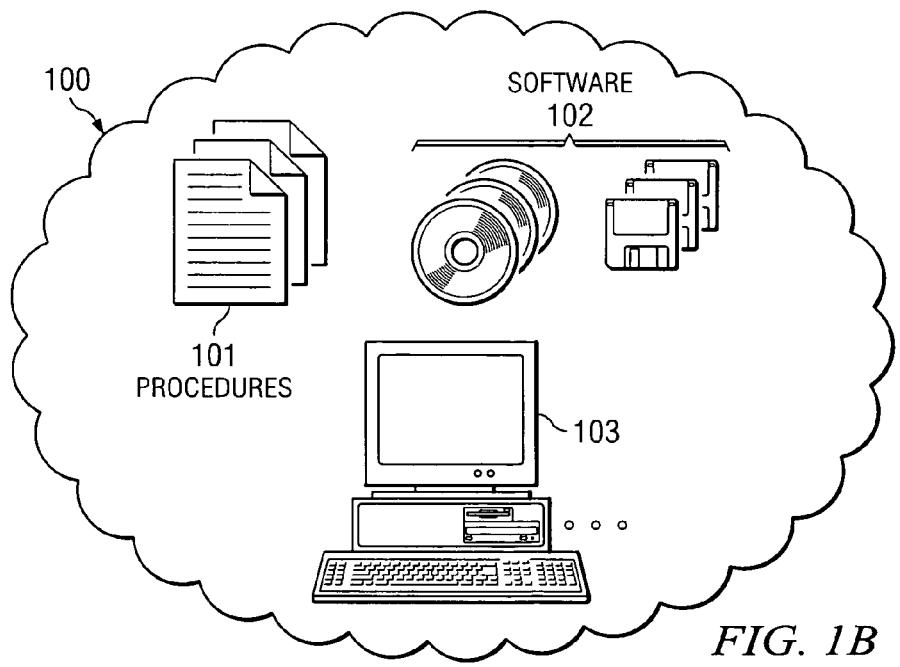
FIG. 1B is a schematic diagram illustrating an example embodiment of an identity management system.

FIG. 1B illustrates an example embodiment of identity management system 100. In the embodiment shown, identity management system 100 includes procedures 101, software applications 102, and computers 103. In certain embodiments, identity management system 100 may include provisions for developing, populating, and/or modifying one or more authoritative identity sources. An authoritative identity source may broadly represent a collection of identities utilized by identity management system 100. In a particular embodiment, an authoritative identity source may represent one or more databases containing a compilation of data for a plurality of system users. In these embodiments, the compilation of data may include one or more identifiers for each of the system users, current relationships between each of the system users and organization 10, information related to current responsibilities for each of the system users, and associations between system users and one or more supervisors and/or managers. In particular embodiments, the compilation of data may also include a list of entitlements.

In certain embodiments, identity management system 100 may include provisions for determining which system users have access to which networks, applications, data sources, and/or platforms. For example, identity management system 100 may include provisions for determining which system users have access to basic functions such as email and/or word processing applications. In certain embodiments, identity management system 100 may include elements which address provisioning, enforcement, and auditing. In certain embodiments, the elements of identity management system 100 that address provisioning may include one or more applications that automate the setup required to establish a new system user and their identities. In particular embodiments, these elements may enable one or more functional entities to manage an entire employee life cycle including role/responsibility changes and/or terminations.

In certain embodiments, the elements of identity management system 100 that address enforcement may operate to ensure that organization 10 maintains the integrity of its information by protecting against unauthorized access. In particular embodiments, these elements may provide granular control over which system users may access which resources and what those system users are allowed to do with those resources. In certain embodiments, the elements of identity management system 100 that address auditing may facilitate the tracking and reporting of identities and/or entitlements, as needed to comply with one or more regulations. In particular embodiments, these elements may provide for post-event forensics analysis and may assist in determining threat origins and in preventing additional attacks.

Figure 2:
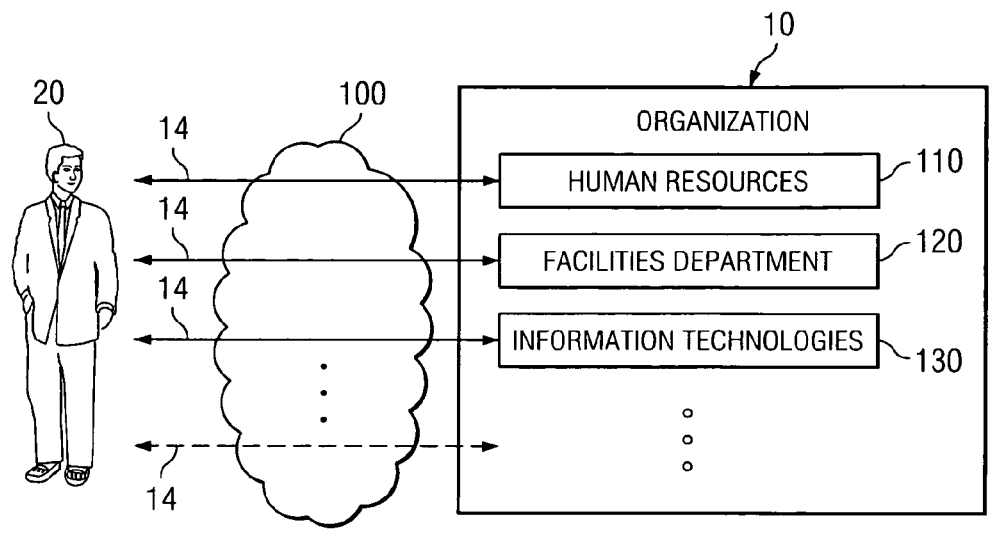
FIG. 2 is a block diagram illustrating an employee of an organization with example identities associated with that employee and an example identity management system, according to particular embodiments.
Figure 3:
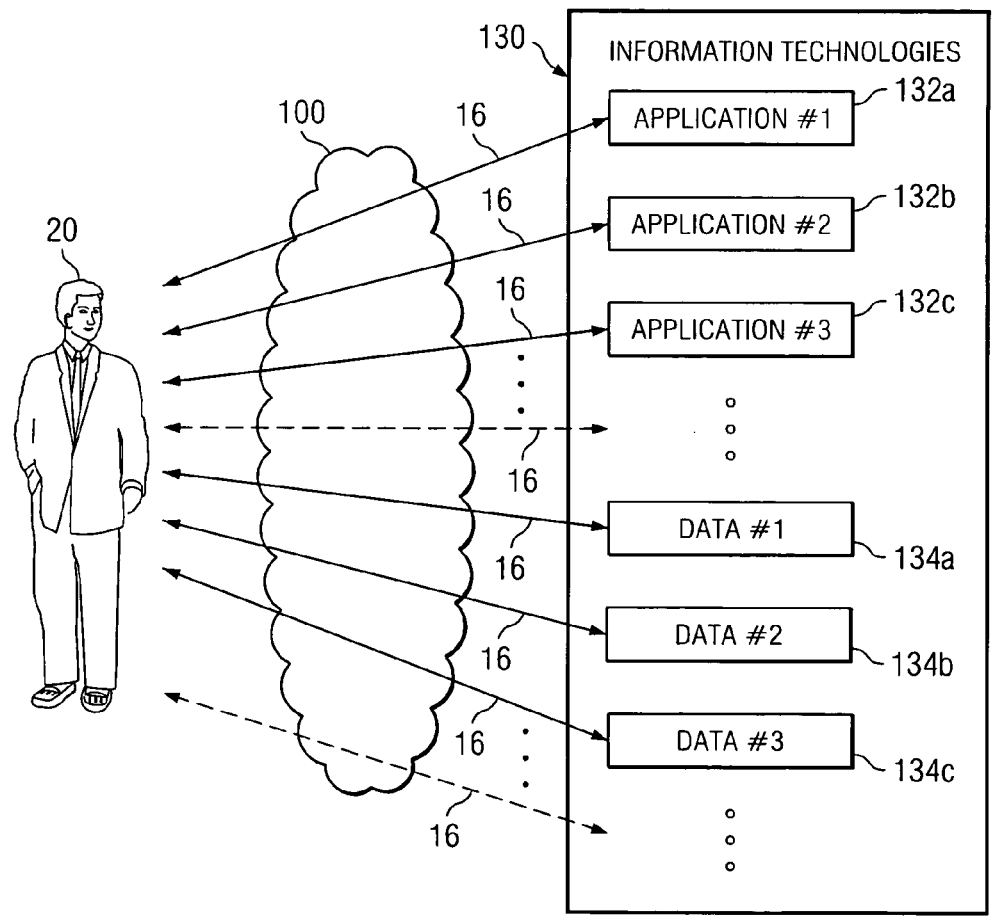
FIG. 3 is a block diagram illustrating an employee of an organization with example entitlements associated with that employee and an example identity management system, according to particular embodiments.
Figure 7:
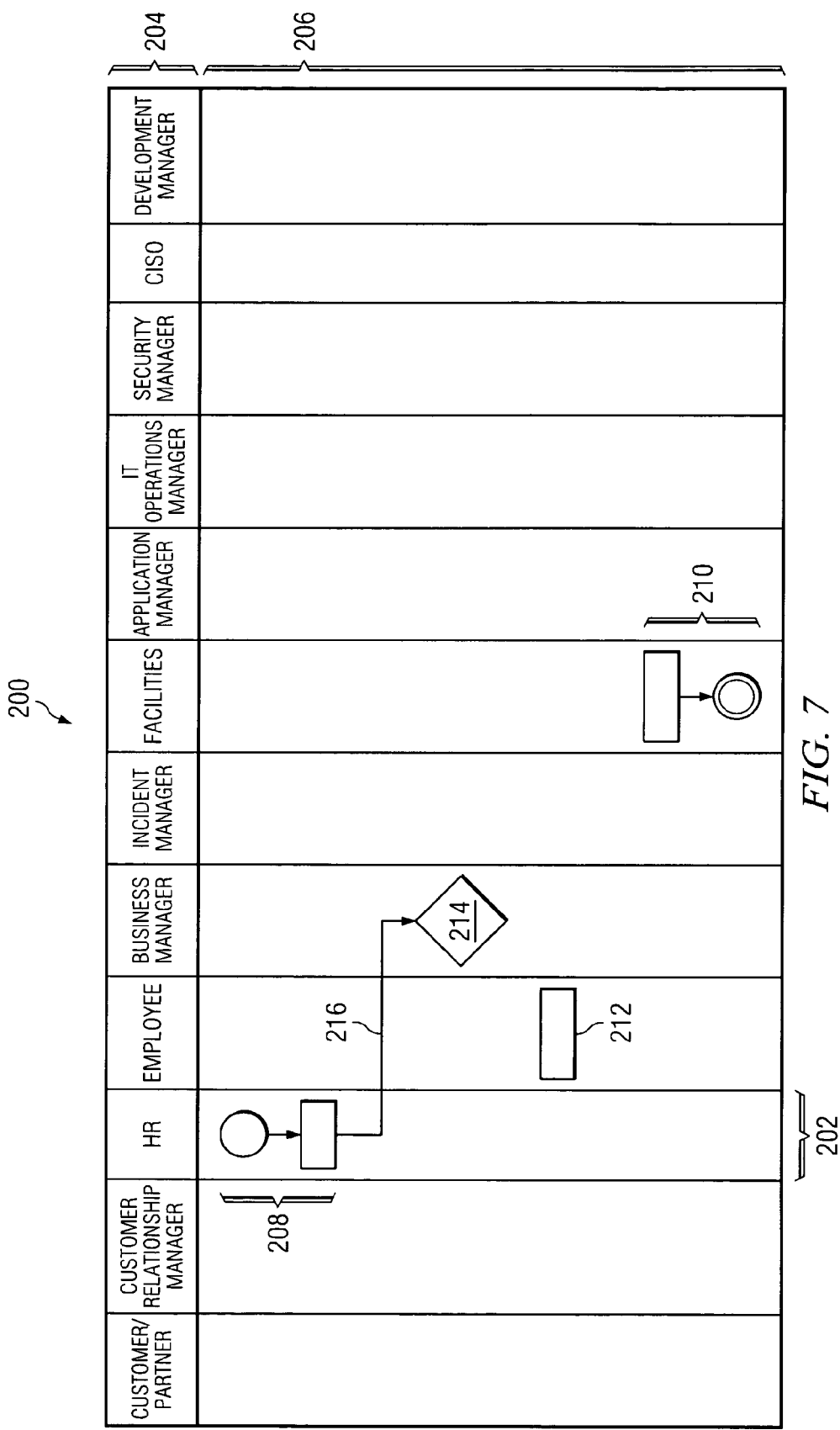
FIG. 7 is a chart illustrating example elements of an example identity management process flow diagram template, according to particular embodiments.
Figure 9A:
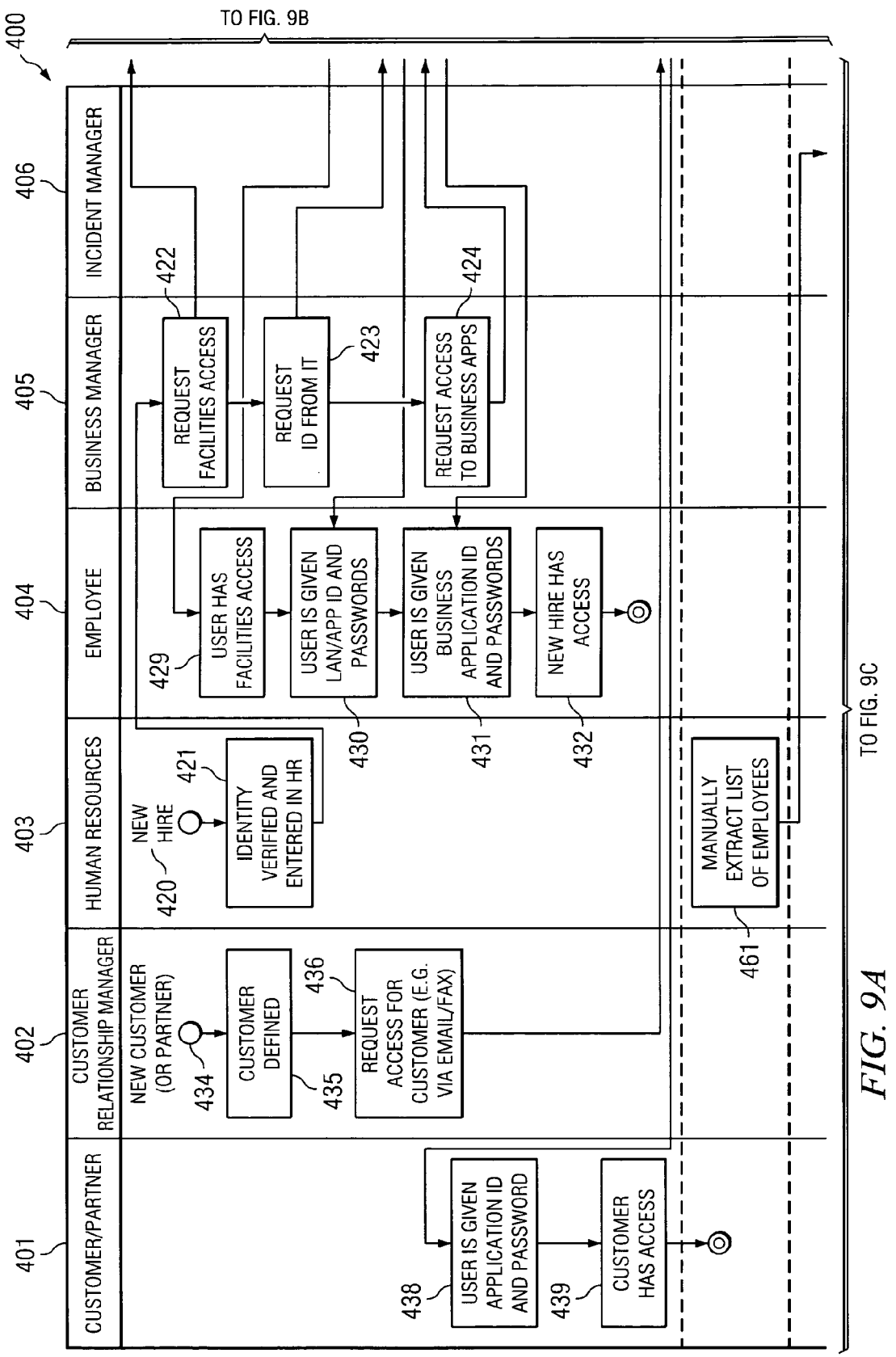
Figure 9B:
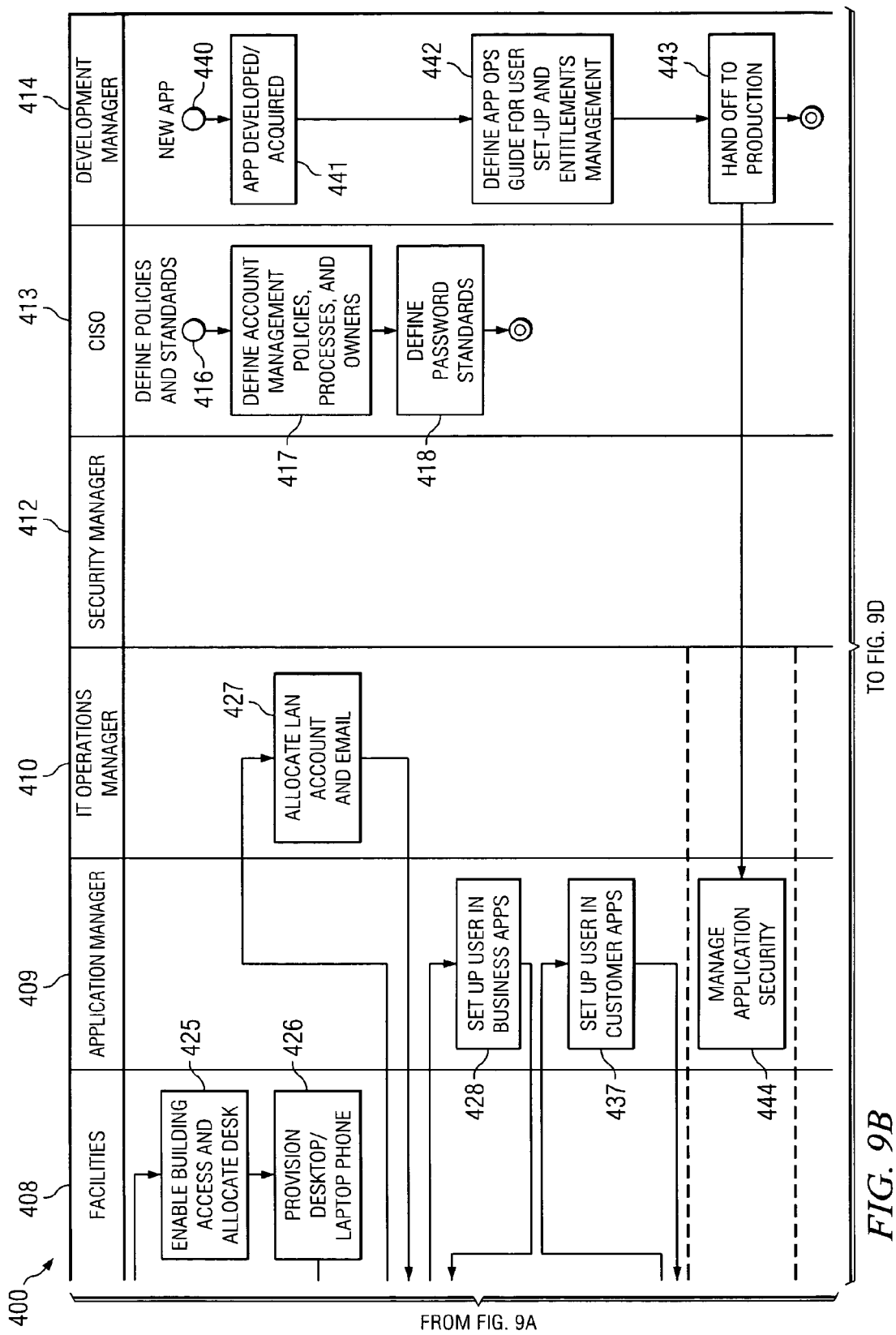
Figure 9C:
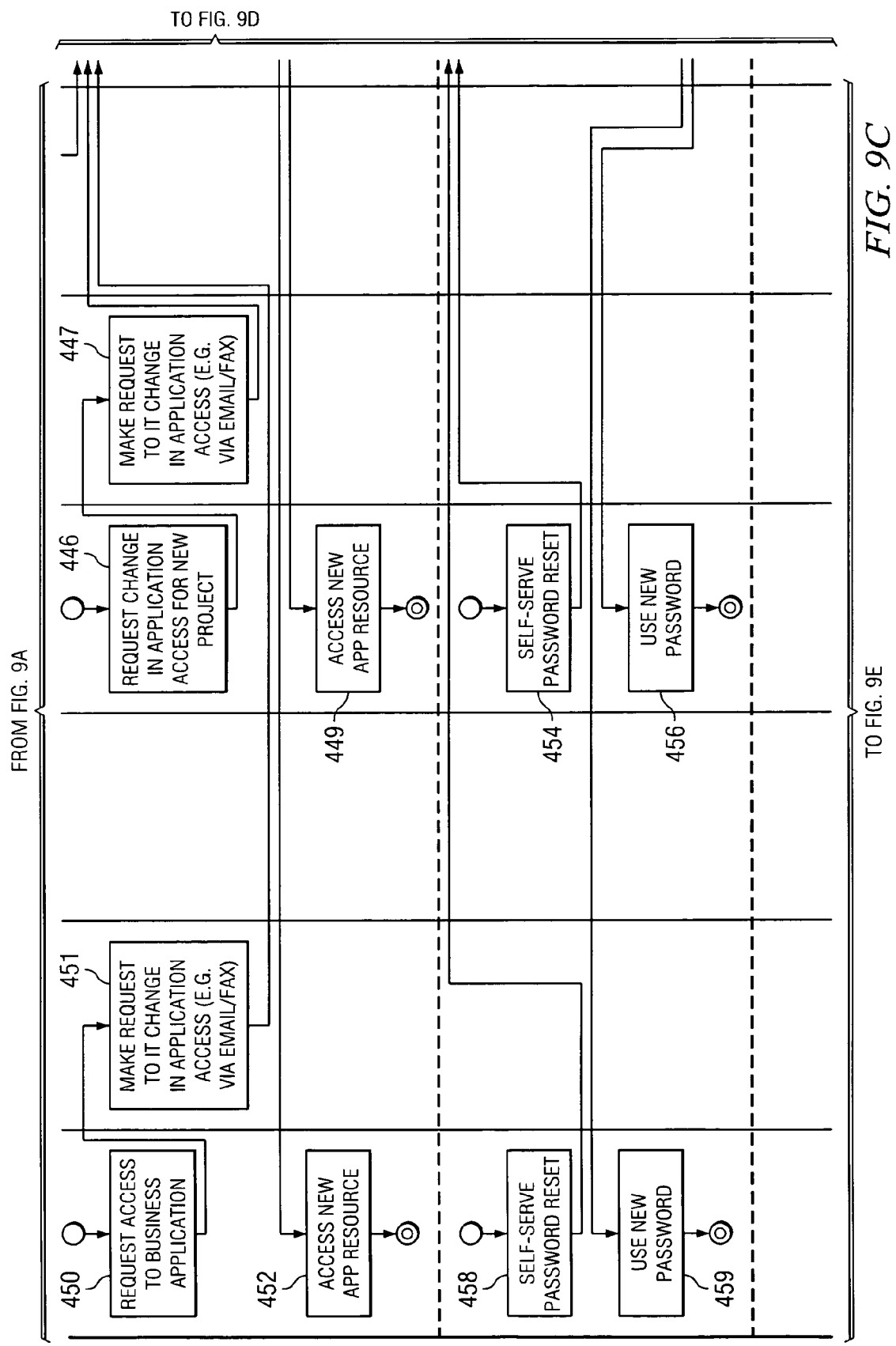
Figure 9D:
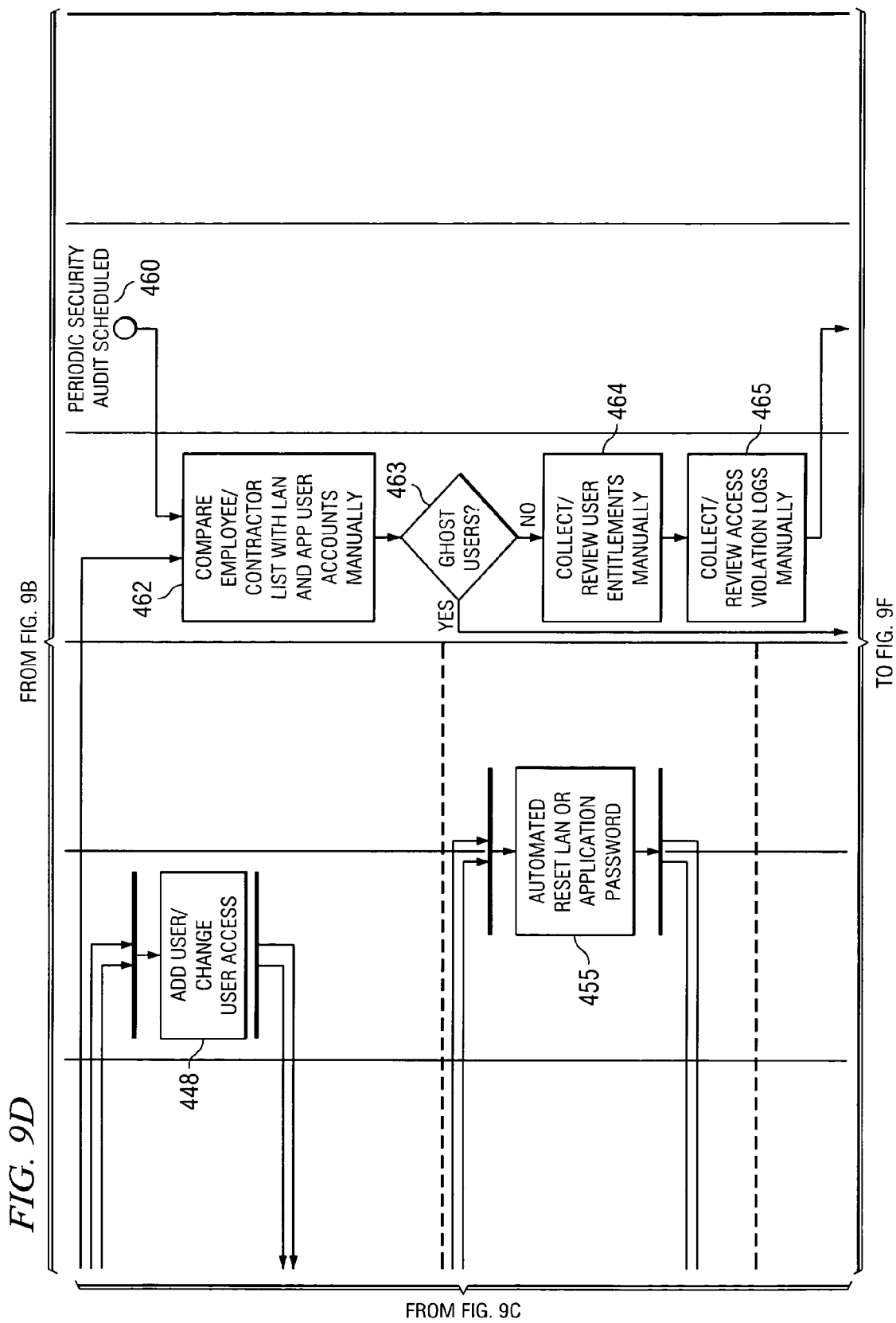
Figure 10A:
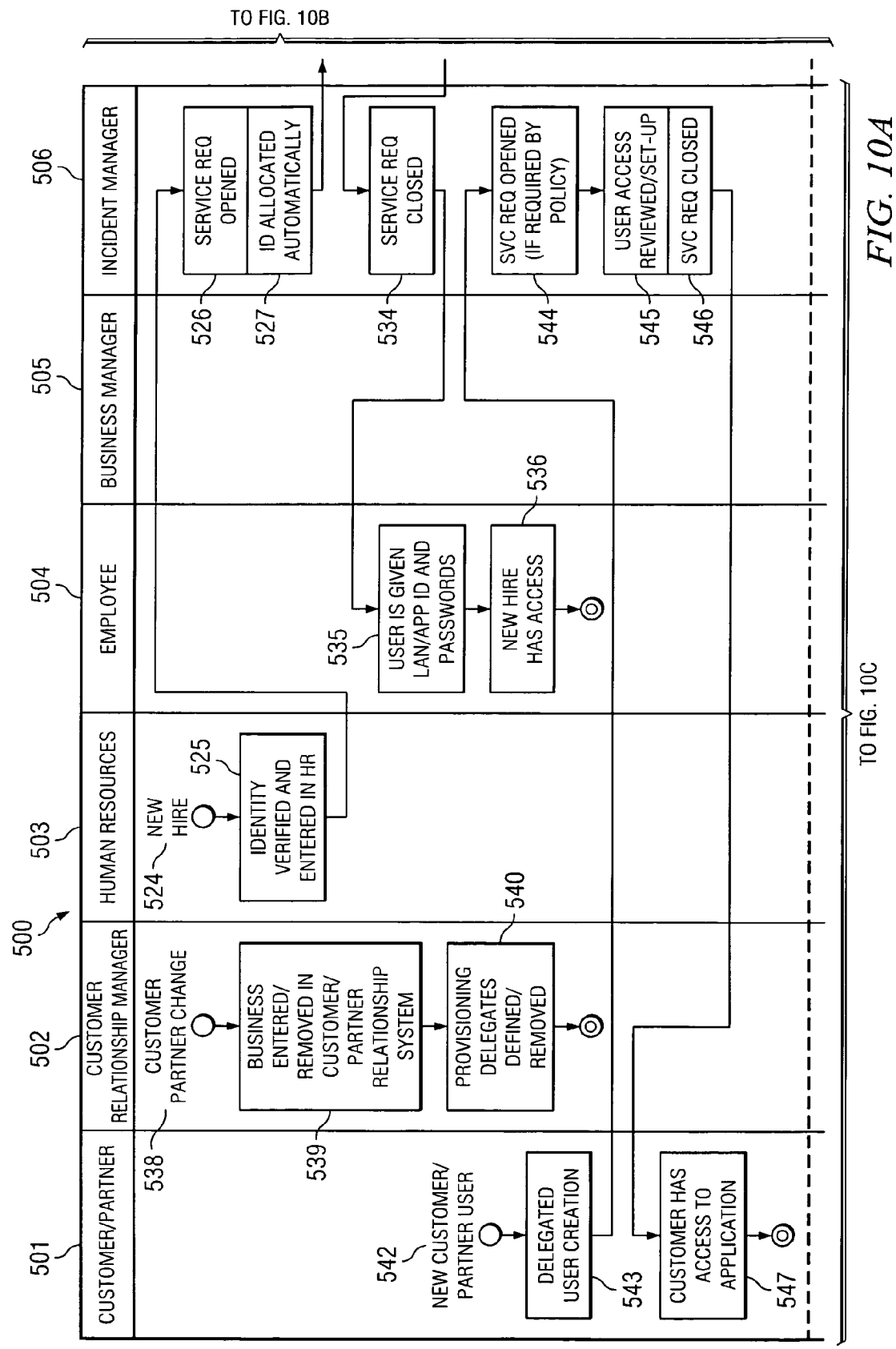
Figure 10B:
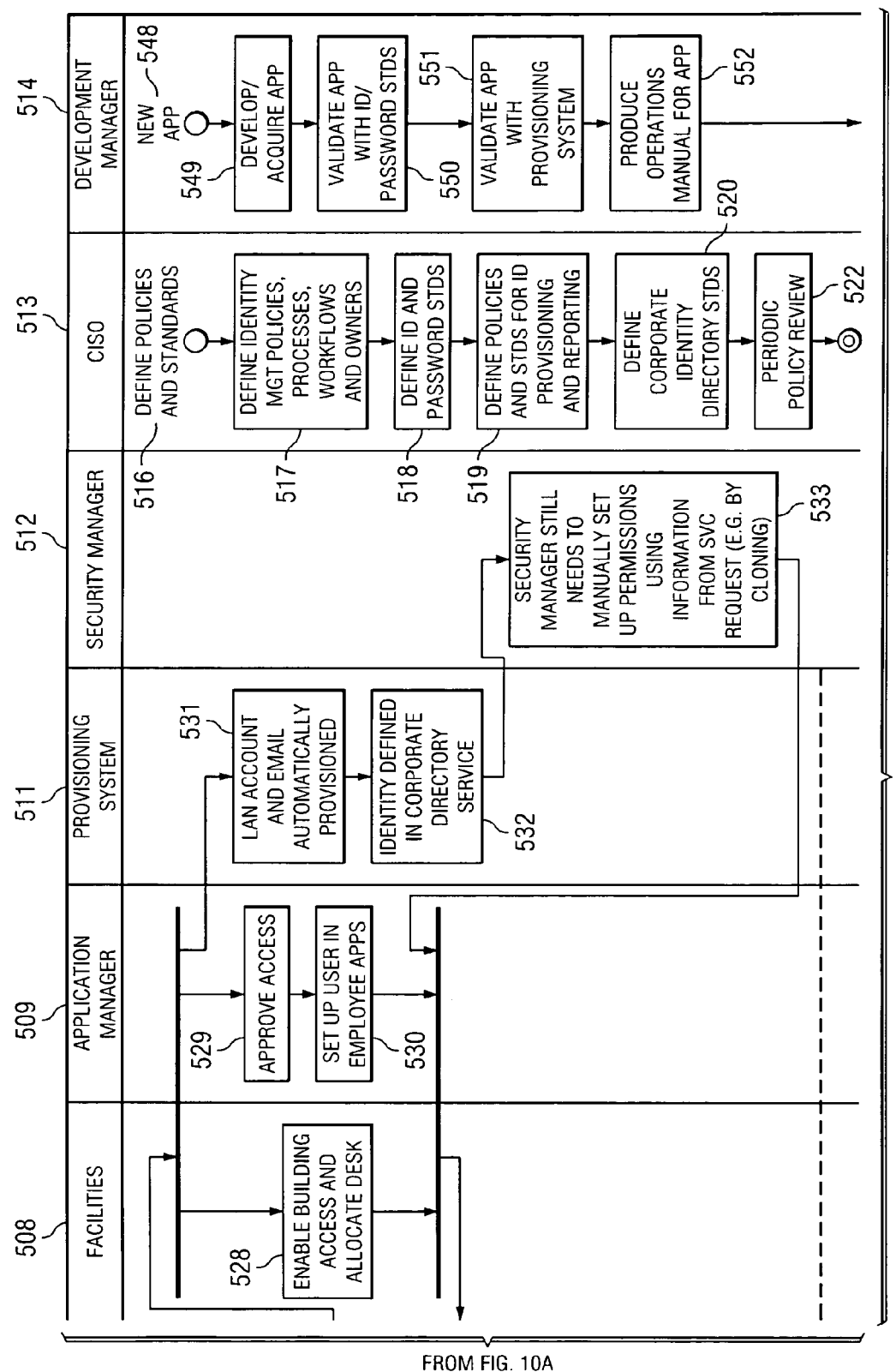
Figure 10D:
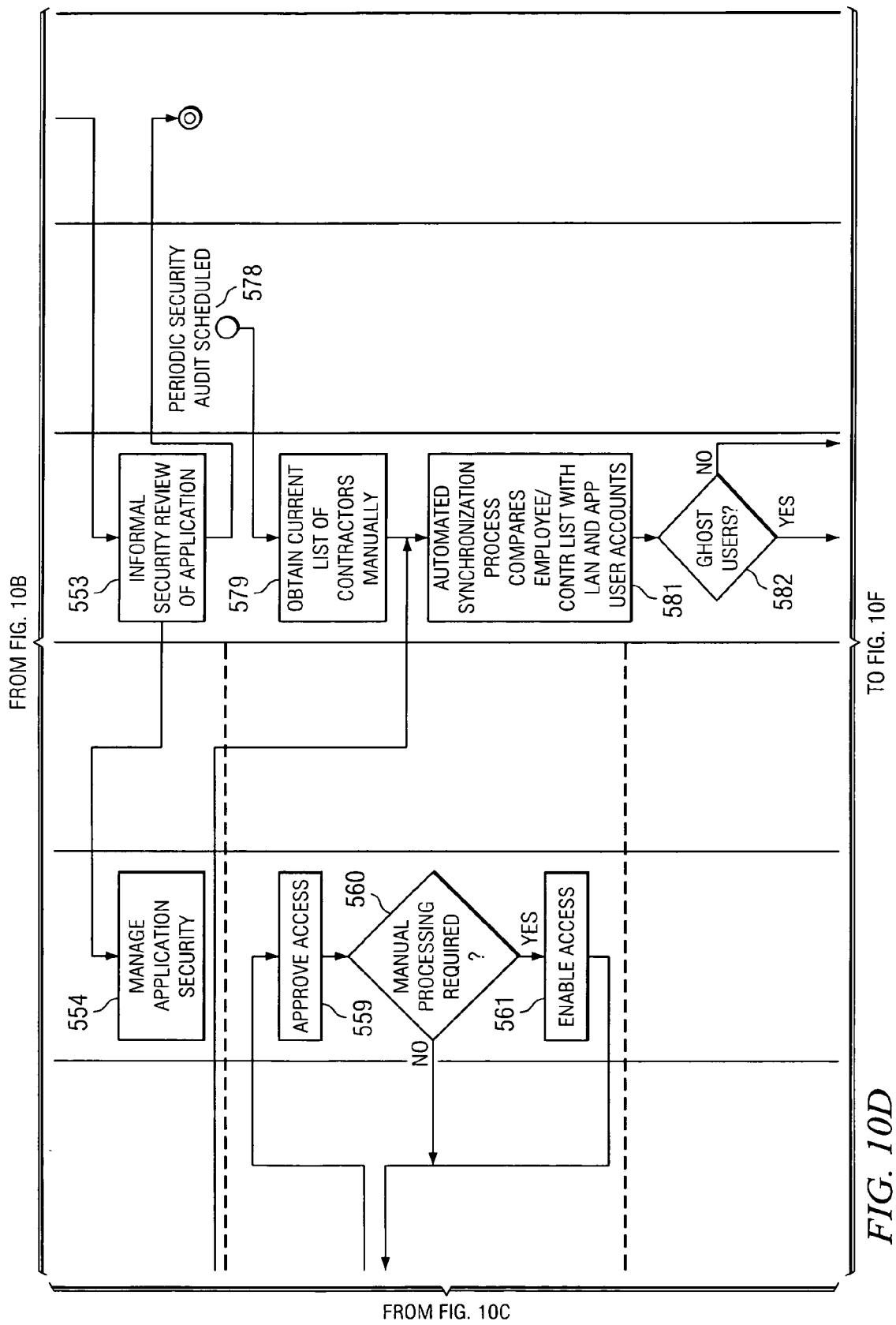
Figure 10E:
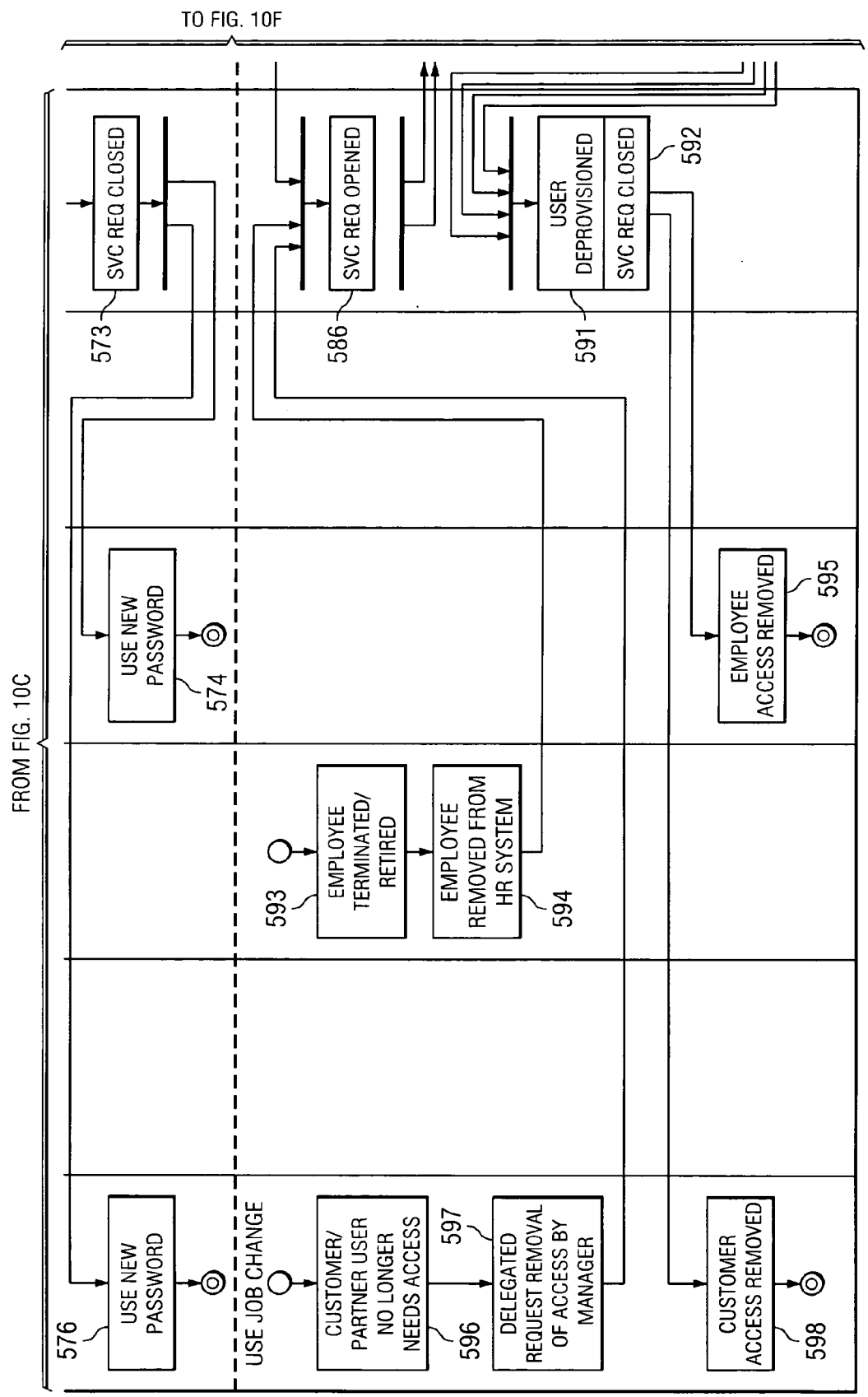
Figure 10F:
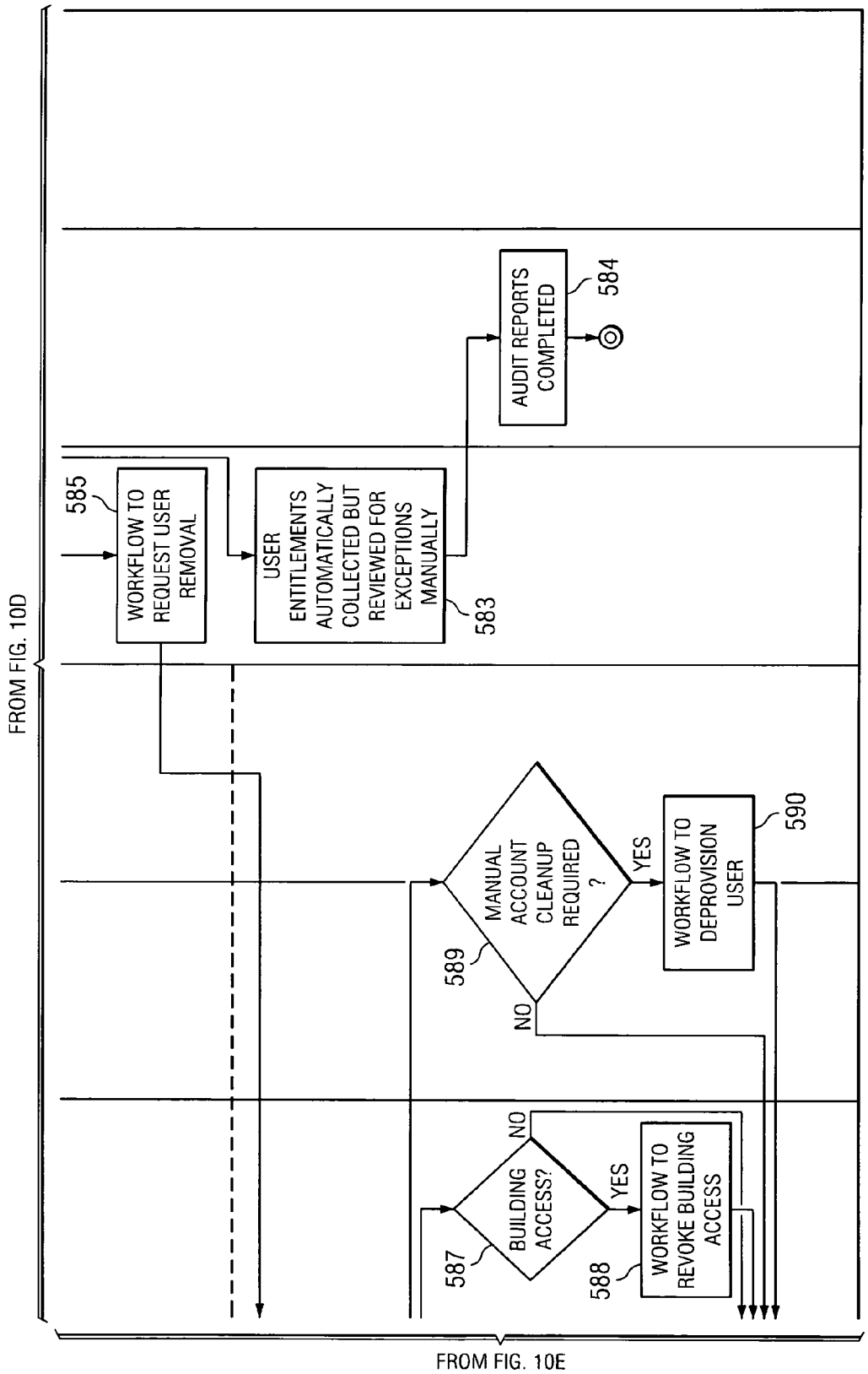
Figure 11A:
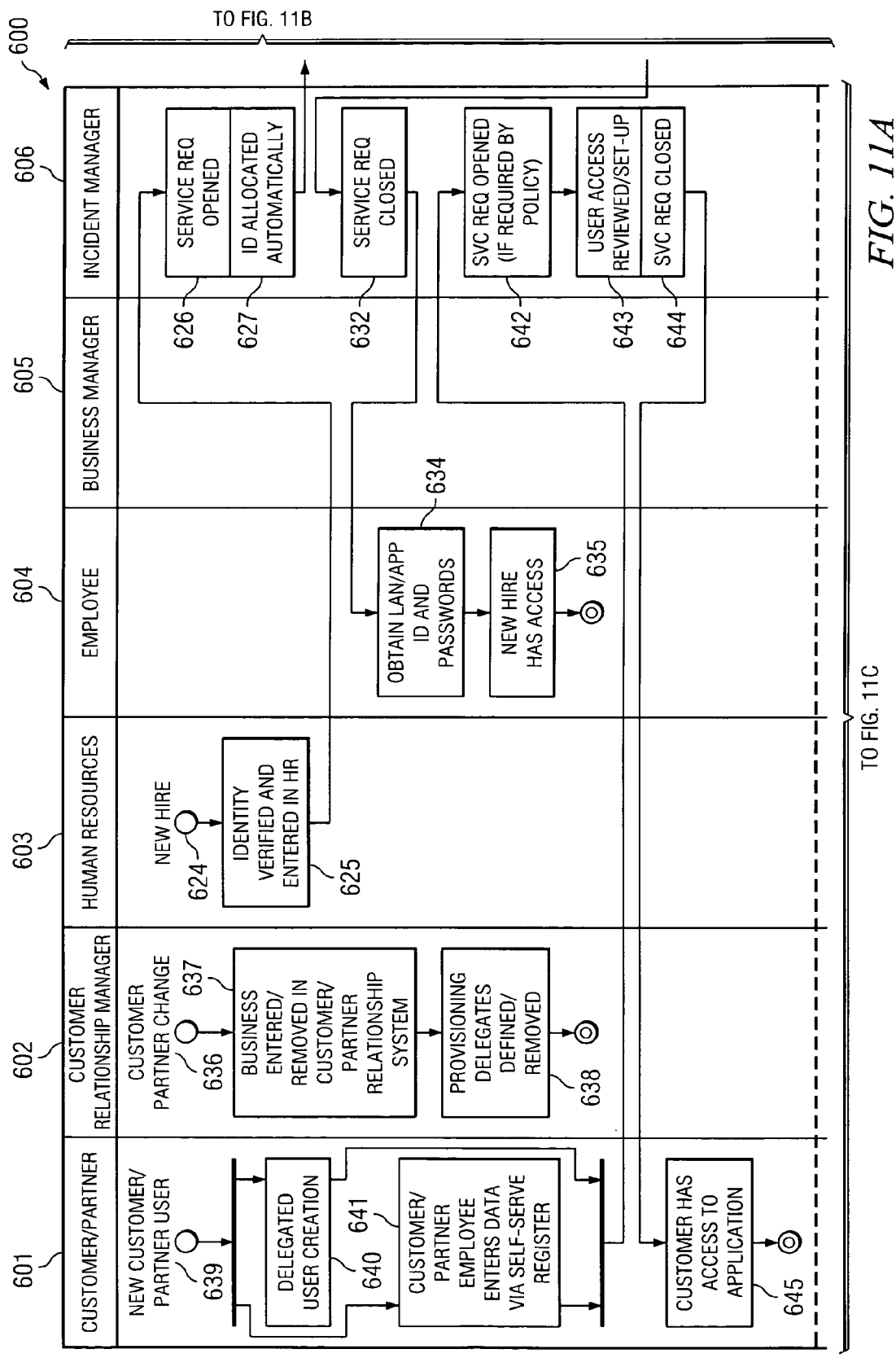
Figure 11B:
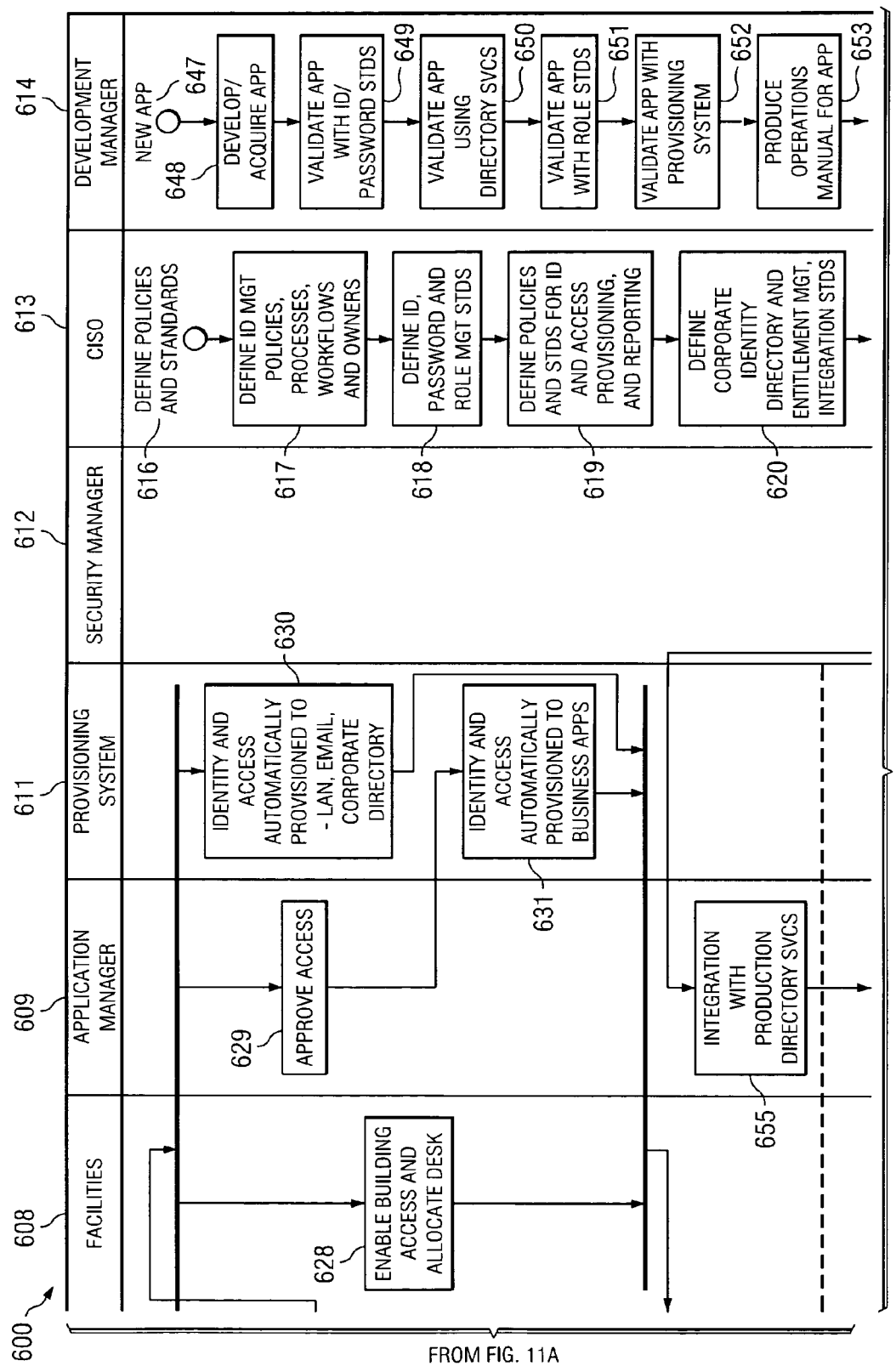
Figure 11D:
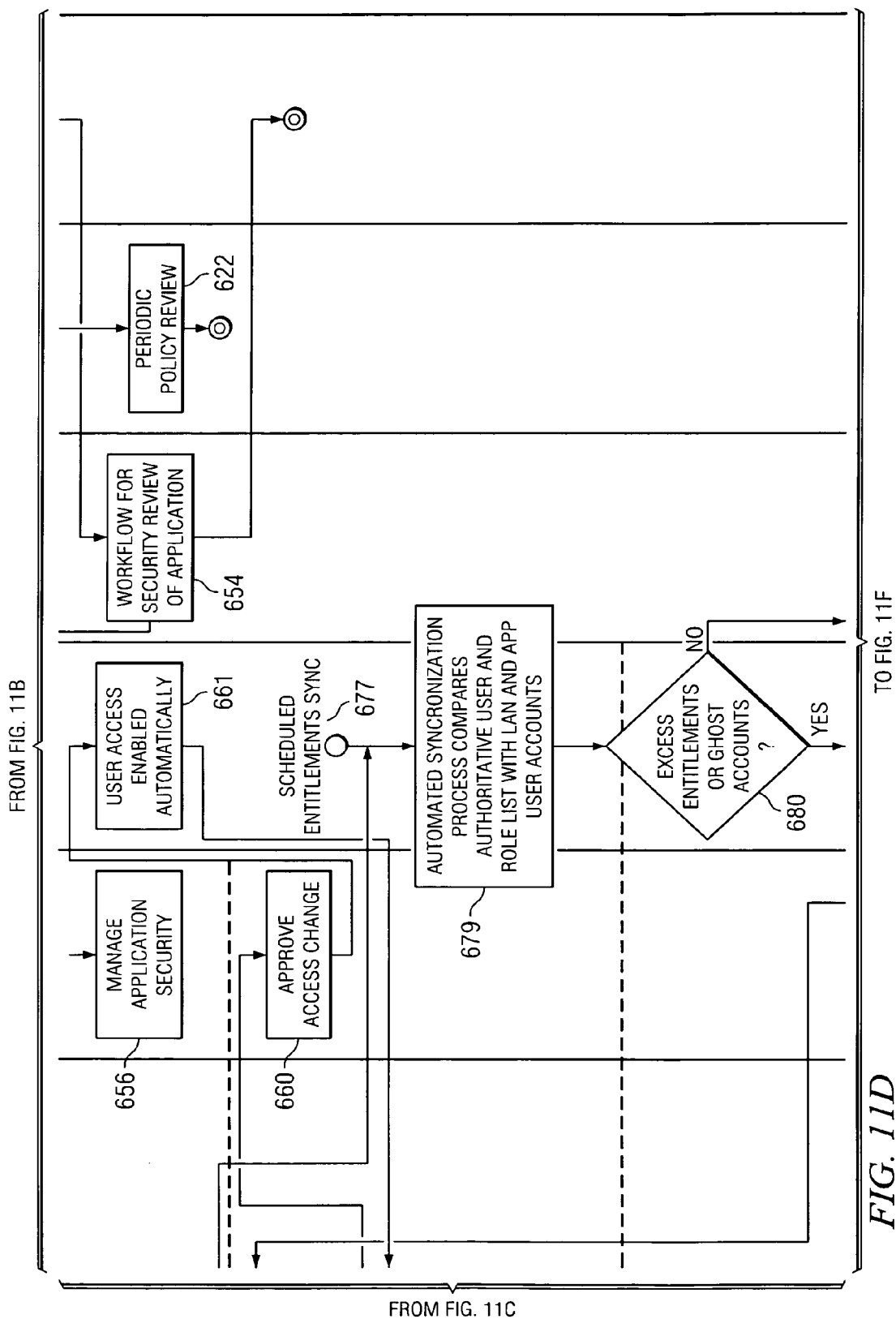
Figure 11E:
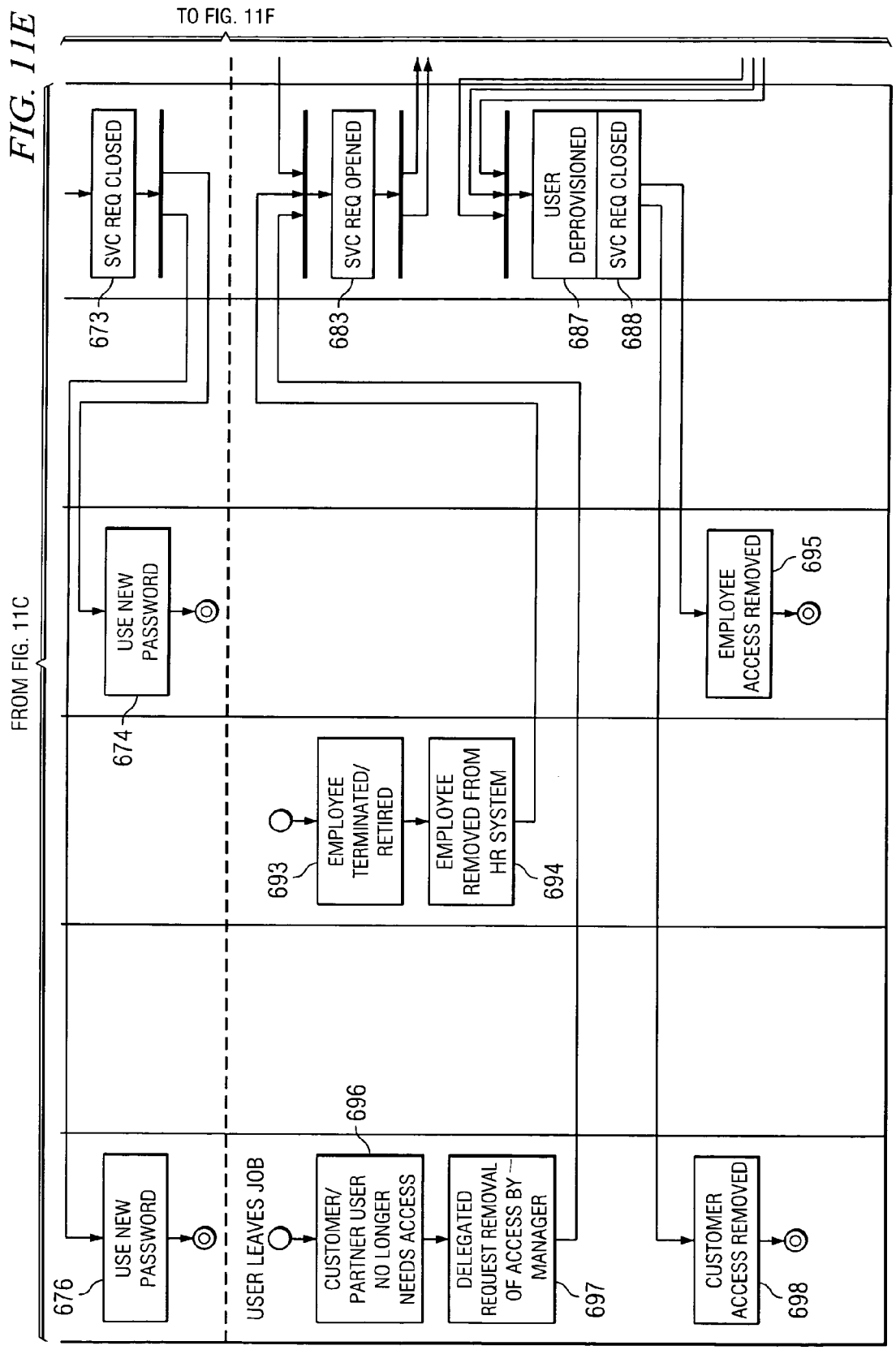
Figure 11F:
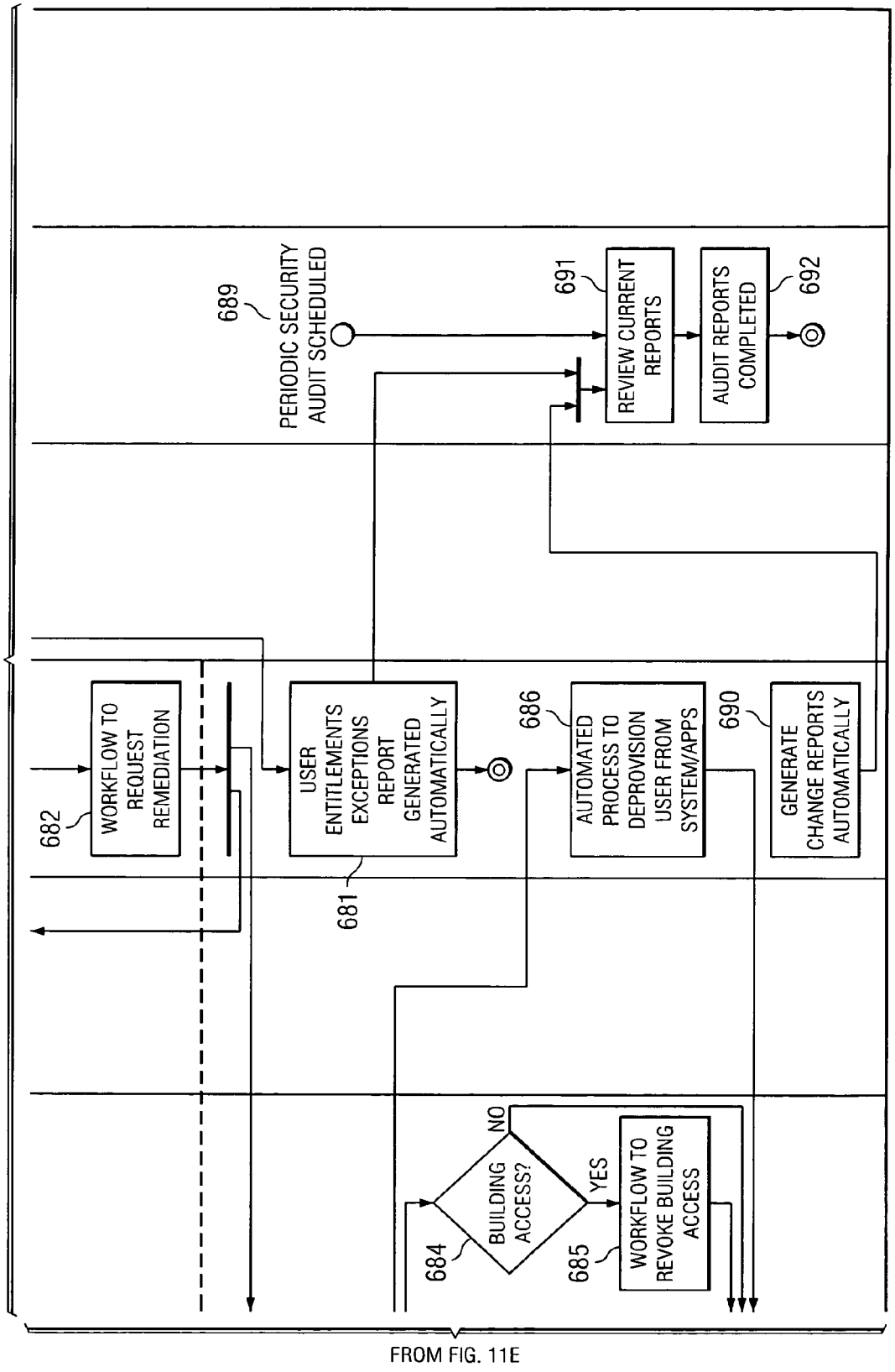
Figure 12A:
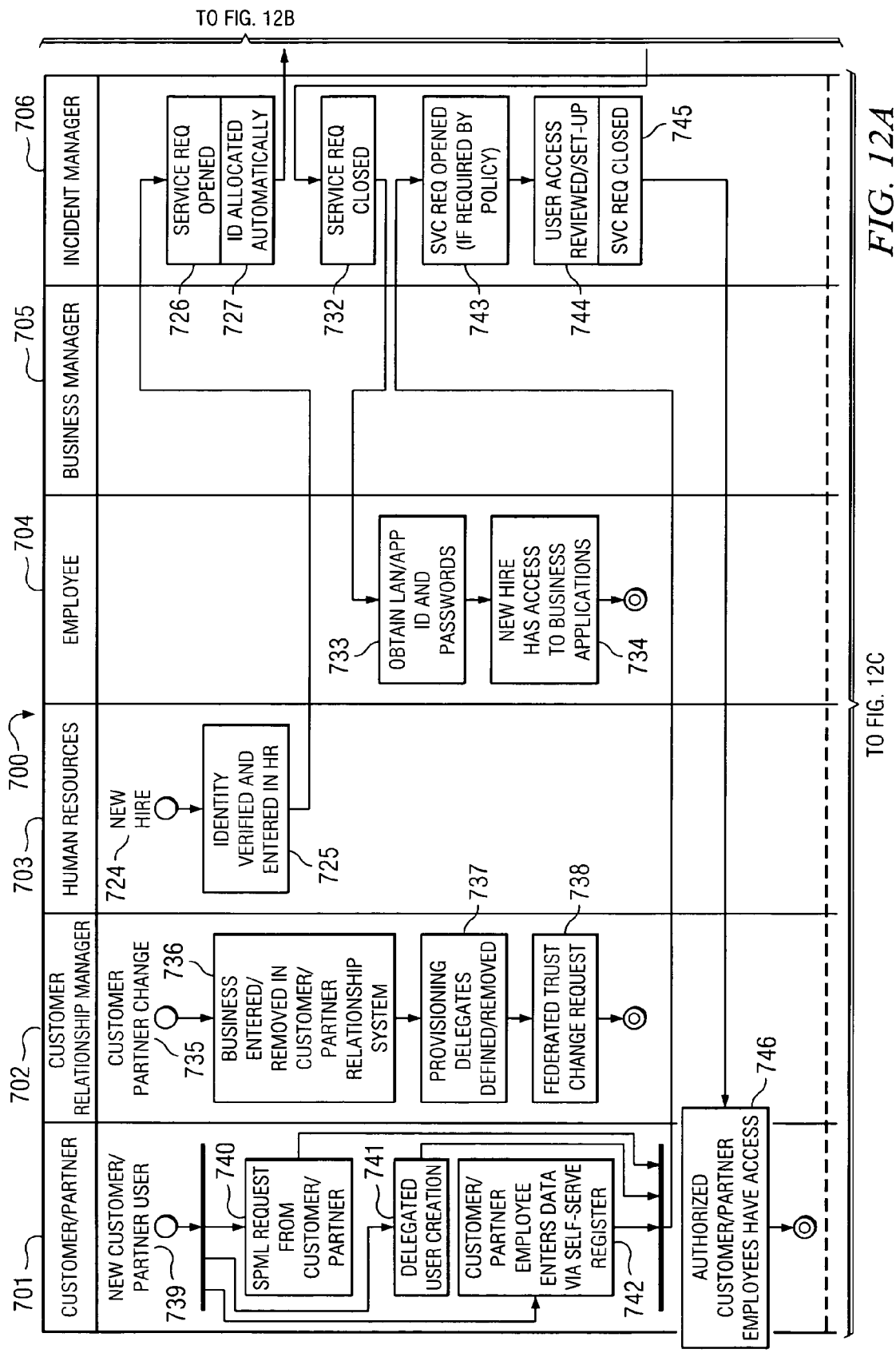
Figure 12B:
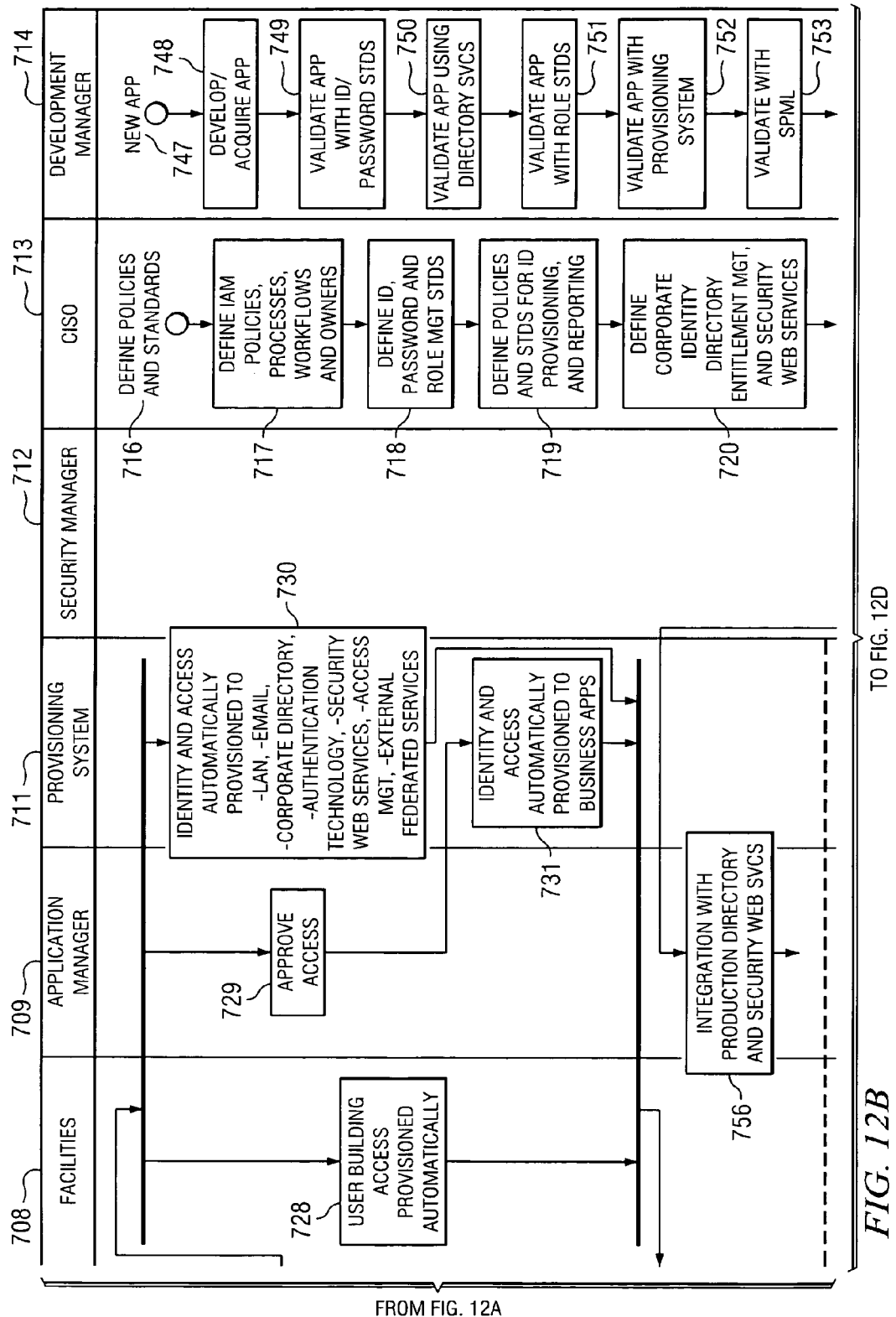
Figure 12D:
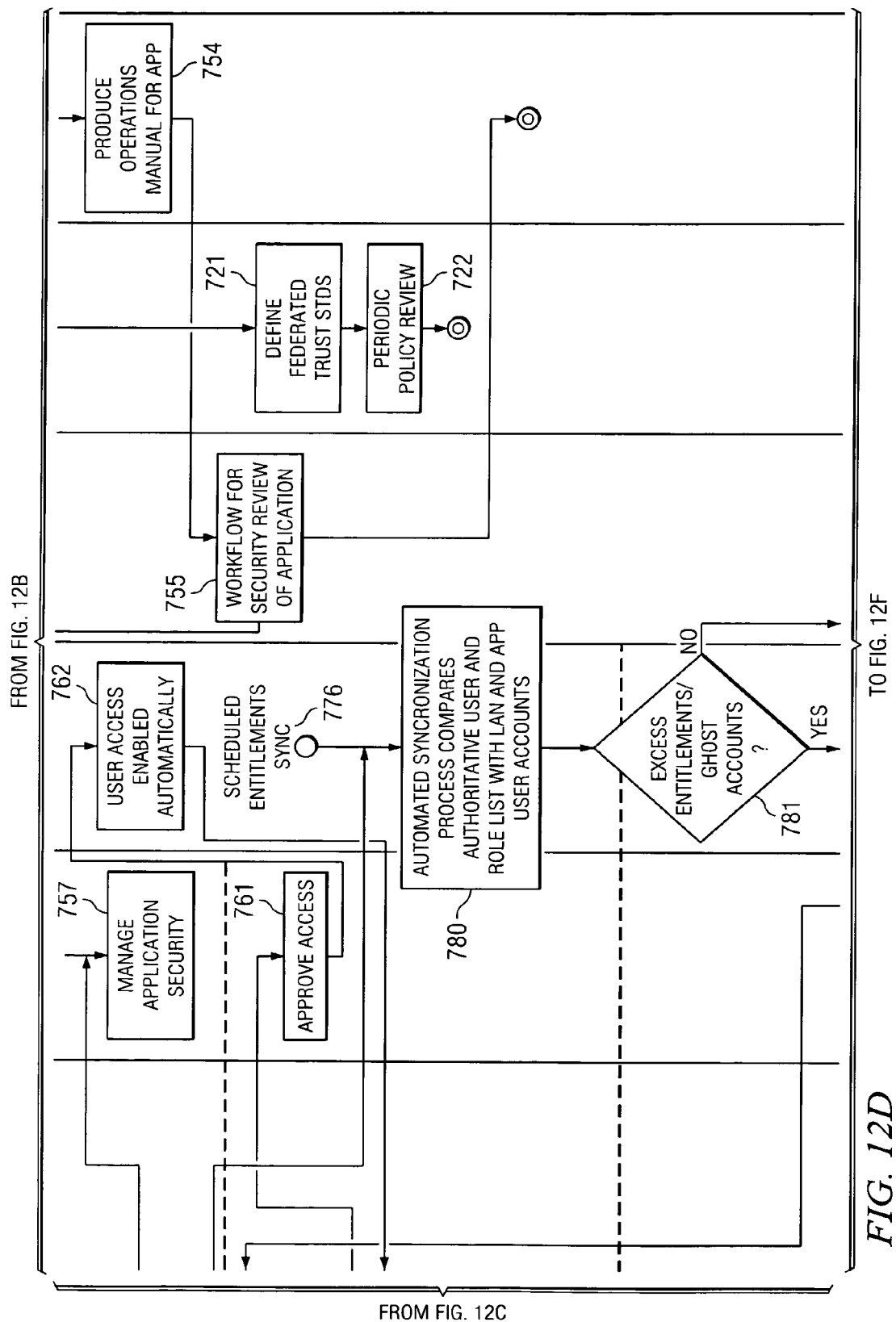
Figure 12F:
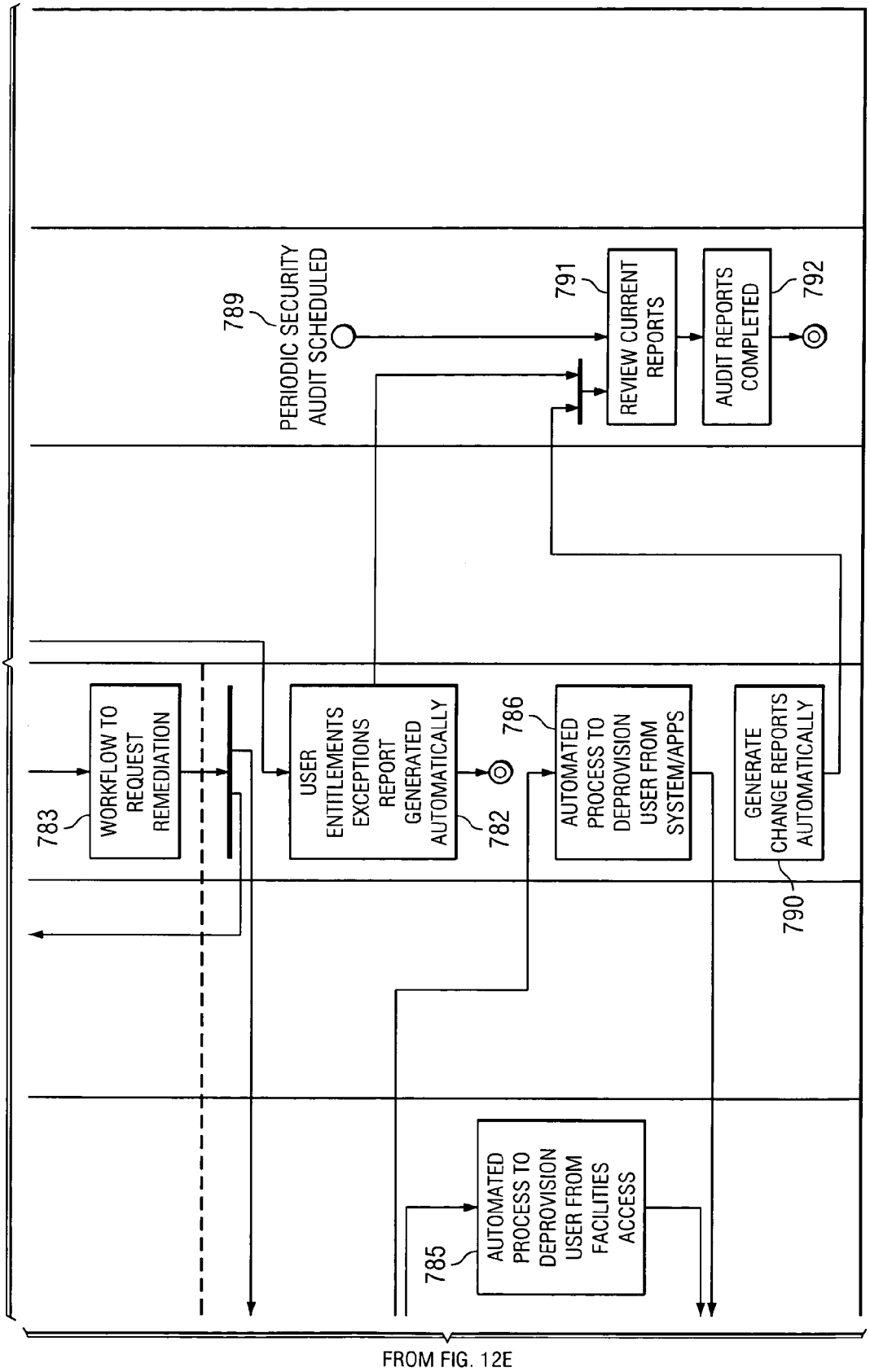

Additional details regarding the relationships between a system user, such as an employee, and various functional entities are included in FIGS. 2-3; FIGS. 4-5 provide example cycles associated with identity management system 100; FIG. 7 illustrates an example template of a tool for use in tracking processes associated with identity management system 100; and FIG. 8 illustrates elements of an example maturity model that may be used to develop or improve an identity management system 100.

FIG. 2 is a block diagram showing an employee 20 of organization 10, example identities 14 associated with employee 20, and an example identity management system 100, according to particular embodiments illustrating additional example details of organization 10. In this example, organization 10 may have a plurality of functional entities such as, for example, Human Resources Department 110, Facilities Department 120, Information Technologies Department 130, and various other functional entities.

In certain embodiments, Facilities Department 120 may include one or more functional entities responsible for allocating physical resources and/or providing access to physical resources within organization 10. For example, Facilities Department 120 may include one or more functional entities responsible for providing desks, office furniture, phone systems, and/or physical access to one or more campuses, buildings, and/or rooms. In a particular embodiment, Facilities Department 120 may provide such access through the use of RFID tags, barcodes, encoded magnetic strip cards, and/or through any other appropriate security device.

In certain embodiments, Information Technologies Department 130 may include one or more functional entities responsible for developing new software applications and/or managing existing software applications within organization 10. For example, in certain embodiments, Information Technologies Department 130 may include an application manager, an Information Technologies Operations Manager, and/or a Development Manager. In certain embodiments, Information Technologies Department 130 may include one or more software applications and/or hardware systems such as an Incident Manager and/or a provisioning system.

In certain embodiments, organization 10 may have additional functional entities such as, for example, one or more supervisors for the system user, a Security Manager, and/or a Chief Information Security Officer. In certain embodiments, each system user, such as for example employee 20, may have unique identities 14 associated with a plurality of functional entities associated with organization 10. In certain embodiments, the system user may represent partner 30, supplier 40, customer 50, and/or an employee or functional entity within one or more of these. In certain embodiments, identity management system 100 may be utilized to manage the plurality of identities 14 for each system user. In a particular embodiment, identity management system 100 may be utilized to generate or manage a single unique identity 14 for each system user.

FIG. 3 is a block diagram showing employee 20 of organization 10, example entitlements 16, and an example identity management system 100, according to particular embodiments, illustrating additional details of information technologies 130 of FIG. 2. In certain embodiments, organization 10 may have an Information Technologies Department 130 that manages a plurality of applications 132 and a plurality of data sources 134. In certain embodiments, a system user, such as employee 20, may be provided with access to one or more applications 132 and/or one or more data sources 134. These accesses may be managed through the use of one or more entitlements 16 associated with the system user. In certain embodiments, an identity management system 100 may be utilized to manage the plurality of entitlements 16 associated with the system user. In a particular embodiment, identity management system 100 may be utilized to generate audit reports identifying the entitlements 16 for a system user at a point in time or for a range of times.

In certain embodiments, in order for identity management system 100 to effectively manage the identities of the various system users, identity management system 100 may need to provide for the events that may occur within organization 10. Certain of these events may be viewed as part of one or more of various cycles. As described in greater detail below with respect to FIGS. 4, 5 and 6, example cycles may include an employee life cycle, a software implementation cycle, and an audit cycle. In certain embodiments, certain elements of identity management system 100 may support one or more of these cycles.

FIG. 4 is a flow diagram, indicated generally at 60, illustrating example elements of an employee life cycle. In the embodiment shown, employee life cycle 60 may include the hiring of and/or intake of new employees 20, at step 62; changes in employee responsibilities, at step 64; and/or termination of an employee 20, at step 66. In employee life cycle 60, at step 62, new accounts may be allocated to employee 20, new resources may be allocated to employee 20, and employee 20 may receive various entitlements. These new accounts may be related to various software applications, data sources, and/or other appropriate computer related resources. In certain embodiments, these accounts may be financial accounts such as retirement accounts and/or purchasing accounts.

The resources allocated to employee 20 during step 62 may include information technologies resources and/or facilities resources. Example information technologies resources may include computers, PDAs, VPN access devices, etc. Example facilities resources may include office furniture (such as a desk, chairs, or file cabinets, phone equipment, and/or other appropriate physical equipment. The various entitlements may generally include computer access and/or physical access. In certain embodiments, computer access may be access to one or more applications, one or more data sources, and/or one or more computers or platforms. In certain embodiments, physical access may include access to a campus, building, room, and/or certain types of equipment. In certain embodiments, these various entitlements may be provided through the use of passwords, magnetic strip cards, RFID tags, physical or electronic keys, and/or any other appropriate method, technique, or device.

In certain embodiments, change in responsibilities 64 may be related to a status change (such as a change in physical location and/or a change in job title) and/or a change in the business of organization 10. In certain embodiments, change in responsibilities 64 may be associated with the provision of new accounts, new resources, and/or new entitlements. In certain embodiments of employee life cycle 60, change in responsibilities 64 may occur several times and may have different provisions each time.

In certain embodiments, termination 66 may be associated with employee 20 quitting, being fired, retiring, being laid off, etc. In certain embodiments, termination 66 may require accounts to be closed, resources to be reclaimed, and/or entitlements to be cancelled.

In certain embodiments, each employee 20 may acquire a plurality of identities that may enable employee 20 to utilize various accounts, resources, and entitlements. As employee 20 progresses through employee life cycle 60, these identities may change, employee 20 may take on new identities, and/or employee 20 may relinquish one or more identities. In certain embodiments, every employee 20 within organization 10 may have at least one identity, however, every employee 20 may also have a plurality of identities throughout employee life cycle 60.

Similar to employee life cycle 60, in certain embodiments, individuals and/or entities associated with partners 30, suppliers 40, and/or customers 50, may acquire various accounts, resources, and/or entitlements. In these embodiments, these individuals and/or entities may utilize one or more identities.

FIG. 5 is a flow diagram, indicated generally at 70, illustrating example elements of a software implementation cycle. In certain embodiments, one or more functional entities within organization 10 may initiate software implementation cycle 70. At step 72, a new software application may be developed internally and/or acquired from one or more vendors. At step 74, the newly developed and/or acquired software application may be deployed within one or more portions of organization 10. In certain embodiments, when the new software application is deployed, at step 74, this may be accompanied by the issuance of one or more new accounts and/or the issuance of one or more new entitlements for the various system users. In certain embodiments, software implementation cycle 70 may include defining operating procedures for the newly developed and/or acquired software application. Similarly, in certain embodiments, software implementation cycle 70 may include defining procedures for setting up system user identities and managing entitlements. Although not shown, similar steps may also be utilized for the implementation of one or more new business practices and/or the implementation of one or more new policies.

FIG. 6 is a flow diagram, indicated generally at 80, illustrating example elements of an audit cycle. In certain embodiments, organization 10 and/or an external entity, may require one or more of various audits on a periodic basis. FIG. 6 illustrates example elements of a portion of an example information technologies audit. At step 82, an audit is initiated. At step 84, a list of the current system users is identified. At step 86, a list of the current accounts is identified. At step 88, a list of the current entitlements is identified. In certain embodiments, an audit may include some, none, or all of these steps. In certain embodiments, one or more audits may be required to comply with certain regulations (i.e., Sarbanes-Oxley), certain quality standards (i.e., ISO 9000), certain discovery related requirements, certain customer and/or partner related requirements, etc. In certain embodiments, one or more of steps 82-82 may be automated.

FIG. 7 illustrates example elements of an example identity management process flow diagram template, indicated generally at 200, according to particular embodiments. An identity management process flow diagram is an example tool for tracking both manual and electronically controlled processes which monitor or manage various aspects of one or more identities within organization 10. As shown in FIG. 7, an identity management process flow diagram may be configured with a plurality of rows and columns. Each column, or "swimlane," may be associated with one or more functional entities. In the embodiment shown, the name, description, and/or title of the one or more functional entities is identified in area 204.

Area 206, shown below area 204, includes a variety of process steps, shown as icons, with each icon being associated with the functional entity identified at the top of the swimlane where the icon is positioned. In certain embodiments, an icon may generally represent one or more text boxes, pictures, digital graphics, geometric shapes, alphanumeric strings, or any other appropriate element or image that can provide an indication of one or more process steps included within an identity management process flow diagram. In certain embodiments, icons 208 may designate the beginning, or initial steps, for a process. Similarly, in certain embodiments, icon 210 may designate the completion, or final steps, for a process. In certain embodiments, icons 214 may be utilized to indicate decisions and/or conditions which may determine a process flow. In certain embodiments, icon 212 may be utilized to designate a process step or to provide information about a process. Icon 216 may be used to designate a sequential flow from one step to another step within the process.

In certain embodiments, through the use of an identity management process flow diagram, various aspects of identity management system 100 may be identified, organized, and/or analyzed. The use of an identity management process flow diagram may allow one or more functional entities to define the set of processes which enable the tracking of compliance to one or more policies or regulations. For example, an identity management process flow diagram may allow auditors to track compliance through a user-entitlements review. In certain embodiments, the use of an identity management process flow diagram may allow for the assignment of specific process steps to identified functional entities within organization 10.

In certain embodiments, an identity management process flow diagram may be developed through and/or incorporated within an application that allows for the automation of one or more processes within identity management system 100. For example, in certain embodiments, an application may initiate one or more processes or process steps within identity management system 100, in response to input by one or more functional entities and/or system users.

In certain embodiments, an identity management process flow diagram may be used to track improvements to or changes in identity management system 100. For example, identity management system 100 may evolve and/or mature to meet the changing needs of organization 10, and, in these embodiments, an identity management process flow diagram may be used to implement, document, and/or facilitate these evolutions and/or maturities.

FIG. 8 illustrates example elements of an identity management maturity model, indicated generally at 300, according to particular embodiments. In certain embodiments, identity management maturity model 300 may be implemented to direct the development and/or improvement of identity management system 100 within organization 10. In certain embodiments, the elements within identity management maturity model 300 may be used as targets, or milestones, in the development of a more efficient and comprehensive identity management system 100. In the embodiment shown, identity management maturity model 300 includes four levels of maturity of identity management systems 100: active 310, efficient 320, responsive 330, and business-driven 340. Each of the elements within identity management maturity model 300 may represent a target identity management system 100 and/or a snapshot in time of the development of identity management system 100 within organization 10. FIGS. 9-12 provide example identity management process flow diagrams illustrating example identity management systems 100 according to the level of maturity shown by example identity management maturity model 300 shown in FIG. 8.

In certain embodiments, characteristics of an active identity management system may include centrally managed and standardized password policies, with self-serve password reset capabilities. These characteristics may also include security administration being performed by a system administrator, manual processes being defined for user management and auditing, and user accounts being generally managed in multiple administrative silos across various servers and applications.

In certain embodiments, characteristics for an efficient identity management system may include security policies and standards defined for identity management with separate security management functions distinct from system administrators. These characteristics may also include identity management implemented with provisioning workflows and automated entitlement reporting and deprovisioning based on an authoritative human resources identity source. A workflow may broadly represent a defined process for communicating a series of steps through multiple individuals or entities. For example, a workflow may be set up in a software application such that a request may be entered into the system and then routed in a predetermined path to appropriate reviewers, approvers, and/or entities performing activities related to the request. In certain embodiments, such workflows may provide consistent processes, reduce data entry, and/or improved audit trails.

In certain embodiments, characteristics for an efficient identity management system may also include externalized use of security and delegated administration and consistent password policy management. Delegated administration may broadly represent providing authorization to one or more individuals or entities to administrate one or more aspects of identity management system 100. In certain embodiments, delegated administration may allow an individual or entity closer to a certain group of system users to manage the identities for those system users as a portion or a subset of an authoritative identity source. For example, in a particular embodiment, an employee of partner 50 may be authorized to administer identities for other employees within partner 50.

Externalized security for an application may broadly represent provisions for and/or the ability of an application to utilize security protections established or enabled by a system or application external to the particular application. For example, in certain embodiments, a security services application may be utilized to control system user access for a separate application. In a particular example, a single security services application may be utilized to control system user access for substantially all of the business-related software applications utilized within the organization.

In certain embodiments, characteristics of a responsive identity management system may include support for role-based provisioning for most critical systems and applications which may enable automated provisioning and automated generation of entitlement exception reports. These characteristics may also include common definitions for users of applications through directory services. These characteristics may also include externalized security and business workflows defined so that a review process for applications allows a security team to verify adherence to standards.

In certain embodiments, characteristics for a business driven identity management system may include support for access management integration with provisioning, utilization of web services for integration between business applications, implementation of federated trust, and an extension of a provisioning system to support non-information technologies related environments (e.g., building access systems). Federated trust may broadly represent one-way or two-way sharing of identities across multiple organizations. In certain embodiments, the implementation of federated trust may to enable external Services Provisioning Markup Language (SPML) requests from authorized business partners. In certain embodiments, characteristics for a business-driven identity management system may also include automated workflow requests for provisioning in response to changes in one or more customer management databases (CMDBs).

FIGS. 9A-9F provide an example graphical tool, shown here as identity management process flow diagram 400, illustrating certain aspects of an example "active" identity management system, according to particular embodiments. In the embodiment shown, active identity management process flow diagram 400 represents processes and activities that affect or are affected by twelve different functional entities including: customer/partner 401, Customer Relationship Manager 402, Human Resources Department 403, employee 404, Business Manager 405, Incident Manager 406, Facilities Department 408, Application Manager 409, Information Technologies Operations Manager 410, Security Manager 412, Chief Information Security Officer 413, and Development Manager 414.

In certain embodiments, multiple functional entities may be combined and/or other functional entities may perform processes identified as being performed by a particular functional entity. For example, in certain embodiments, the functions provided by Development Manager 414 and Application Manager 409 may be consolidated in a single functional entity. As another example, one or more software applications and/or hardware systems may be utilized to perform all or a portion of one or more steps identified with one or more functional entities. In certain embodiments, processes associated with customer/partner 401 may apply to one or more partners 30, customers 50, suppliers 40, employees or entities within one of these, and/or other external entity. In certain embodiments, similar flexibility may apply to aspects of identity management process flow diagrams described in FIGS. 10-12.

In active identity management process flow diagram 400, there are eleven distinct, but not necessarily independent, integrated process flows (IPFs). These IPFs include aspects of employee life cycle 60, software implementation cycle 70, and audit cycle 80. The IPFs include a process for defining policies and standards, a process for bringing in a new employee 404, a process for implementing a new customer/partner 401, and a process for implementing a new application. In addition, active identity management process flow diagram 400 includes IPFs for requesting changes in entitlements for employee 404 and customer/partner 401, changing passwords for employee 404 and customer/partner 401, performing scheduled periodic security audits, terminating employee 404, and terminating customer/partner 401's entitlements and accesses.

In the embodiment shown, define policies and standards IPF 416 includes steps 417 and 418, both within the responsibility of Chief Information Security Officer 413. At step 417, Chief Information Security Officer 413 defines account management policies, processes, and owners. At step 418, Chief Information Security Officer 413 defines password standards.

In the embodiment shown, new hire IPF 420 includes steps 421-432. At step 421, Human Resources Department 403 verifies and enters an identity for employee 404 into the human resources system. At step 422, Business Manager 405 requests facilities access for employee 404. At step 423, Business Manager 405 requests an identity from Information Technologies Operations Manager 410. At step 424, Business Manager 405 requests access for employee 404 to business applications. At step 425, in response to request 422, Facilities Department 408 provides building access for employee 404 and allocates a desk for employee 404. At step 426, Facilities Department 408 provides a desktop computer, laptop computer, and/or a phone. At step 427, in response to request 423, Information Technologies Operations Manager 410 allocates a network account and an email account for employee 404. At step 428, in response to request 424, Application Manager 409 sets up employee 404 to use the requested business applications. At step 429, following steps 425 and 426, employee 404 has facilities access. At step 430, following step 427, employee 404 is given network and email identities and passwords. At step 431, following step 428, employee 404 is given identities and passwords for the requested business applications. New hire IPF 420 is completed at step 432 and employee 404 has the necessary identities and entitlements to perform their duties.

In the embodiment shown, new customer/partner IPF 434 includes steps 434-439. At step 435, Customer Relationship Manager 402 defines an identity for customer/partner 401. At step 436, Customer Relationship Manager 402 requests access to one or more applications for customer/partner 401. In certain embodiments, request 436 may be in the form of an email, a letter, or a fax. At step 437, Application Manager 409, in response to request 436, sets up application access for customer/partner 401. At step 438, customer/partner 401 is given an application identity and a password. At step 439, following steps 435-438, customer/partner 401 has access to the requested applications.

In the embodiment shown, new application implementation IPF 440 includes steps 441-444. At step 441, Development Manager 414 develops and/or acquires a new application. At step 442, Development Manager 414 defines an application operator's guide and procedures for user-setup and entitlements management. At step 443, Development Manager 414 hands off the new application to production. At step 444, Application Manager 409 manages the security for the new application.

In the embodiment shown, employee access change IPF includes steps 446-449. At step 446, employee 404 requests a change in application access for a new project. At step 447, Business Manager 405, makes a request to Application Manager 409 to change application access for employee 404. In certain embodiments, request 447 may take the form of an email, a letter, or a fax. At step 448, in response to request 447, Application Manager 409 changes application access for employee 404. At step 449, following steps 446-448, employee 404 has the requested application access.

In the embodiment shown, customer/partner access change IPF includes steps 450-452. At step 450, customer/partner 401 requests access to a business application. At step 451, in response to request 450, Customer Relationship Manager 402 makes a request to Application Manager 409 to change application access for customer/partner 401. In certain embodiments, request 451 may take the form of an email, a letter, or a fax. At step 448, in response to request 451, Application Manager 409 changes application access for customer/partner 401. At step 452, following steps 450, 451, and 448, customer/partner 401 has the requested application access.

In the embodiment shown, employee password reset IPF includes steps 454-456. At step 454, employee 404 initiates a self-serve password reset procedure. At step 455, in response to step 454, one or both of Application Manager 409 and Information Technologies Operations Manager 410 process the self-serve password reset using an automated password reset application. At step 456, following steps 454 and 455, employee 404 has the new password as needed.

In the embodiment shown, customer/partner password reset IPF includes steps 458, 459, and 455. At step 458, customer/partner 401 initiates a self-serve password reset procedure. At step 455, in response to step 458, one or both of Application Manager 409 and Information Technologies Operations Manager 410 process the self-serve password reset using an automated password reset application. At step 459, following steps 458 and 455, customer/partner 401 has the new password as needed.

In the embodiment shown, periodic security audit IPF 460 includes steps 461-466. At step 461, Human Resources Department 403 manually extracts a list of employees 404. At step 462, Security Manager 412 manually compares the employee list with network and application user accounts. At step 463, following steps 461 and 462, Security Manager 412 determines whether there are any "ghost" users. A ghost user may represent a network or application user that does not have a corresponding employee 404 or customer/partner 401. If Security Manager 412 determines at step 463 that there are one or more ghost users, then Security Manager 412 requests the removal of that ghost user at step 467. At step 472, in response to request 467, one or both of Application Manager 409 and Information Technologies Operations Manager 410 remove access for the ghost user for the network and/or application as requested. If Security Manager 412 determines, at step 463, that there are no ghost users, then, at step 464, Security Manager 412 manually collects and/or reviews user entitlements. At step 465, Security Manager 412 manually collects and/or reviews access violation logs. At step 466, following steps 464 and 465, the periodic security audit and the associated reports are completed.

In the embodiment shown, employee termination IPF includes steps 477-481 and 472-473. At step 477, Human Resources Department 403 terminates employee 404. At step 478, Human Resources Department 403, removes employee 404's identity from the human resources system. At step 479, Business Manager 405 requests the removal of employee 404's identities from the information technologies systems. At step 480, Business Manager 405 requests the removal of the employee 404's access. At step 472, in response to request 479, one or both of Application Manager 409 and Information Technologies Operations Manager 410 remove employee 404's access to the network and appropriate business applications. At step 481, in response to request 480, Facilities Department 408 revokes the employee 404's building access. At step 473, following steps 477-481, employee 404's access has been removed.

In the embodiment shown, terminating customer/partner access removal IPF includes steps 484, 485, 472, and 475. At step 484, customer/partner 401 no longer needs access to certain applications. At step 485, Customer Relationship Manager 402 requests the removal of customer/partner 401's access to those certain applications. In certain embodiments, request 485 may take the form of an email, a letter, or a fax. At step 472, in response to request 485, one or both of Application Manager 409 and Information Technologies Operations Manager 410 remove customer/partner 401's access to those certain applications. At step 475, following steps 484, 485, and 472, customer/partner 401's access has been removed for those certain applications.

FIGS. 10A-10F provide an example graphical tool, shown here as identity management process flow diagram 500, illustrating certain aspects of an example "efficient" identity management system, according to particular embodiments.

In the embodiment shown, efficient identity management process flow diagram 500 represents processes and activities that affect or are affected by 12 different functional entities including: customer/partner 501, Customer Relationship Manager 502, Human Resources Department 503, employee 504, Business Manager 505, Incident Manager 506, Facilities Department 508, Application Manager 509, provisioning system 511, Security Manager 512, Chief Information Security Officer 513, and Development Manager 514. In efficient identity management process flow diagram 500, there are 11 distinct, but not necessarily independent, integrated process flows (IPFs). These IPFs include aspects of employee life cycle 60, software implementation cycle 70, and audit cycle 80.

These IPFs include defining policies and standards IPF 516, new hire IPF 524, new customer/partner user IPF 542, customer/partner change IPF 538, and new application implementation IPF 548. In addition, efficient identity management process flow diagram 500 includes IPFs for requesting change in application access for employee 504 and customer/partner 501, self-serve password resets for employee 504 and customer/partner 501, periodic scheduled security audits, and jobs change and/or termination of relationships with employee 504 and/or customer/partner 501.

In the embodiment shown, defining policies and standards IPF 516 includes steps 517-522 associated with Chief Information Security Officer 513. At step 517, the identity management policies, processes, work flows, and owners are defined. At step 518, the identity and password standards are defined. At step 519, policies and standards for identity provisioning and reporting are defined. At step 520, corporate identity directory standards are defined. At step 522, periodic policy reviews are performed.

In the embodiment shown, new hire IPF 524 includes steps 525-536. At step 525, Human Resources Department 503 verifies and enters an identity for employee 504 into the human resources system. At step 526, Incident Manager 506 opens a service request. In certain embodiments, service request 526 may be opened in response to step 525. In certain embodiments, steps 525 and 526 may be linked through the use of one or more applications such that step 526 is automatically performed upon the completion of step 525. At step 527, Incident Manager 506 automatically allocates an identity for employee 504. In certain embodiments, step 527 may be performed by an application in response to the completion of step 526. At step 528, following step 527, Facilities Department 508 enables building access for employee 504 and allocates a desk or other office supplies to employee 504. At step 529, following step 527, Application Manager 509 approves access for employee 504. At step 530, Application Manager 509 sets up employee 504 in appropriate applications. At step 531, provisioning system 511 automatically provisions network and e-mail account access. At step 532, provisioning system 511 adds an identity for employee 504 to a corporate directory service. At step 533, Security Manager 512 manually sets up entitlements for employee 504 based on information included within the service request opened at step 526. In certain embodiments, these entitlements may be set up by cloning entitlements for other system users with similar job titles, responsibilities, etc. At step 534, following the completion of steps 528-530, the service request from step 526 is closed. At step 535, following the completion of steps 524-534, employee 504 is given identities and passwords. At step 536, newly hired employee 504 has the appropriate accesses.

In the embodiment shown, new customer/partner IPF 542 includes steps 543-547. At step 543, customer/partner 501 creates a delegated user. At step 544, following step 543, Incident Manager 506 opens a service request. In certain embodiments, step 544 may or may not be required by the policies defined by Chief Information Security Officer 513. At step 545, Incident Manager 506 reviews the delegated user accesses and sets up any necessary access for delegated user created at step 543. At step 546, if a service request was open at step 544, Incident Manager 506 closes the service request. At step 547, following the completion of step 543-546, customer/partner 501 has access to the appropriate applications.

In the embodiment shown, customer/partner change IPF 538 includes steps 539 and 540. At steps 539, Customer Relationship Manager 502 enters and/or removes the customer/partner 501 from the customer/partner relationship system. At step 504, following step 539, delegated users associated with the entered or removed customer/partner 501 are defined or removed. In certain embodiments, steps 540 and 539 are linked such that step 540 takes place automatically upon the completion of step 539.

In the embodiment shown, new application implementation IPF 548 includes steps 549-554. At steps 549, Development Manager 514 develops and/or acquires a new application. At step 550, Development Manager 514 validates the new application with the identity and password standards defined by Chief Information Security Officer 513 at step 518. At step 551, Development Manager 514 validates the new application with provisioning system 511. At step 552, Development Manager 514 defines an operations manual for the application. At steps 553, following steps 549-552, Security Manager 512 performs an informal security review of the new application. At step 554, following the informal security review at step 553, Application Manager 509 begins managing the security for the new application.

In the embodiment shown, employee access change IPF includes process steps 556-564. At steps 556, employee 504 requests a change in application access for a new project. At step 557, Business Manager 504 approves the change requested at step 556. At step, Incident Manager 506 opens a service request. At step 559, Application Manager 509 approves application access for employee 504. If manual processing is required, at step 560, then Application Manager 509 enables application access for employees 504, at step 561. At step 562, following the completion of steps 559-561, employee 504's application access has been changed. At step 563, Incident Manager 506 closes the service request, opened at step 558. At step 564, following the completion of steps 556-563, employee 504 has access to the requested applications.

In the embodiment shown, customer/partner access change IPF includes steps 558-563 and 566-568. At step 566, a delegated request for a change in application access for customer/partner 501 is provided. At step 567, Customer Relationship Manager 502 approves delegated request 566. In certain embodiments, step 567 may or may not be required by one or more policies defined by Chief Information Security Officer 513.

At step 558, Incident Manager 506 opens a service request. At step 559, Application Manager 509 approves application access for customer/partner 501. If manual processing is required, at step 560, then Application Manager 509 enables application access for customer/partner 501, at step 561. At step 562, following the completion of steps 559-561, customer/partner 501's application access has been changed. At step 563, Incident Manager 506 closes the service request, opened at step 558. At step 568, following the completion of steps 558-563, customer/partner 501 has access to the requested applications.

In the embodiment shown, employee password reset IPF includes steps 570-574. At step 570, employee 504 initiates a self-serve password reset procedure. At step 571, Incident Manager 506 opens a service request. At step 572, Incident Manager 506 resets the password for employee 504. In certain embodiments, steps 571 and 572 are linked, and step 572 may be performed automatically upon the completion of step 571. At step 573, Incident Manager 506 closes the service request opened at step 571. At step 574, following the completion of steps 570-573, employee 504 has the new password as needed.

In the embodiment shown, customer/partner password reset IPF includes steps 575-576 and 571-573. At step 575, customer/partner 501 initiates a self-serve password reset procedure.

In certain embodiments, steps 571 and 572 are linked, and step 572 may be performed automatically upon the completion of step 571. At step 573, Incident Manager 506 closes the service request opened at step 571. At step 576, customer/partner 501 has the new password as needed.

In the embodiment shown, periodic security audit IPF 578 includes steps 579-592. At step 579, Security Manager 512 manually obtains a list of current contractors. At step 580, Human Resources Department 503 automatically generates a list of employees from the human resources system. At step 581, Security Manager 512 performs an automated synchronization process that compares the employee list and the contractor list with network and application user accounts. Following step 581, if ghost users are identified at step 582, then Security Manager 512 requests the removal of that ghost user. In response to the request at step 585, Incident Manager 506 opens a service request at step 586. At step 587, if it is determined that the ghost user had building access, then Facilities Department 508 initiates a revocation to that building access. If it is determined at step 589 that a manual account cleanup is required, then at step 590, one or both of Application Manager 509 and provisioning system 511 deprovision the ghost user identified at step 582. Following the completion of steps 586-590, the ghost user is deprovisioned at step 591 and the service request opened at step 586 is closed at step 592 by Incident Manager 506. At step 583, Security Manager 512 automatically collects user entitlements and manually reviews those user entitlements for exceptions. At step 584, the audit reports are completed by the Chief Information Security Officer 513.

In the embodiment shown, customer relationship manager 502 and business manager 505 periodically review and approve user access at steps 565 and 577 respectively to update the contractor and employee lists. Following approval of user access in steps 565 or 577, Security Manager 512 performs an automated synchronization process that compares the employee list and the contractor list with network and application user accounts, at step 581. Following step 581, and depending upon the determination made in step 582, one or more of steps 585-592 and 595 are performed, as described above.

In the embodiment shown, employee termination IPF includes process steps 593-595 and 586-592. At step 593, Human Resources Department 503 terminates employee 504. At step 594, Human Resources Department 503 removes employee 504 from the human resources system.

In response to the request at step 585, Incident Manager 506 opens a service request at step 586. At step 587, if it is determined that the employee 504 had building access, then Facilities Department 508 initiates a revocation to that building access. If it is determined at step 589 that a manual account cleanup is required, then at step 590, one or both of Application Manager 509 and provisioning system 511 deprovision the employee 504 identified at step 582. Following the completion of steps 586-590, the employee 504 is deprovisioned at step 591 and the service request opened at step 586 is closed at step 592 by Incident Manager 506. At step 583, Security Manager 512 automatically collects user entitlements and manually reviews those user entitlements for exceptions. At step 584, the audit reports are completed by the Chief Information Security Officer 513. At step 595, following the completion of steps 586-592, employee 504's access has been removed.

In the embodiment shown, customer/partner access removal IPF includes steps 596-598 and 586-592. At step 596, customer/partner 501 no longer needs access to certain applications. At step 597, a delegated request for removal of access to the certain applications is generated by a manager of customer/partner 501.

In response to the request at step 585, Incident Manager 506 opens a service request at step 586. At step 587, if it is determined that the customer/partner 501 had building access, then Facilities Department 508 initiates a revocation to that building access. If it is determined at step 589 that a manual account cleanup is required, then at step 590, one or both of Application Manager 509 and provisioning system 511 deprovision the customer/partner 501 identified at step 582. Following the completion of steps 586-590, the customer/partner 501 is deprovisioned at step 591 and the service request opened at step 586 is closed at step 592 by Incident Manager 506. At step 583, Security Manager 512 automatically collects user entitlements and manually reviews those user entitlements for exceptions. At step 584, the audit reports are completed by the Chief Information Security Officer 513. At step 595, following the completion of steps 586-592, customer/partner 501's access has been removed. At step 589, customer/partner 501's access has been removed for those certain applications.

FIGS. 11A-11F provide an example graphical tool, shown here as identity management process flow diagram 600, illustrating certain aspects of an example responsive identity management system, according to particular embodiments. In the embodiment shown, responsive identity management process flow diagram 600 represents processes and activities that affect or are affected by twelve different functional entities, including: customer partner 601, Customer Relationship Manager 602, Human Resources Department 603, employee 604, Business Manager 605, Incident Manager 606, Facilities Department 608, Application Manager 609, provisioning system 611, Security Manager 612, Chief Information Security Officer 613, and Development Manager 614. In responsive identity management process flow diagram 600, there are thirteen distinct, but not necessarily independent, IPFs. These IPFs include aspects of employee life cycle 60, software implementation cycle 70, and audit cycle 80. These IPFs include define policies and standards IPF 616, new hire IPF 624, new customer/partner IPF 639, customer/partner change IPF 636, and new application implementation IPF 647. Responsive identity management process flow diagram 600 also includes employee access change IPF, customer/partner access change IPF, employee password reset IPF, customer/partner password reset IPF, entitlements synchronization IPF 677, periodic security audit IPF 689, employee termination IPF, and terminating customer/partner access IPF.

In the embodiment shown, define policies and standards IPF 616 includes steps 617-622. At step 617, Chief Information Security Officer 613 defines identity management policies, processes, workflows, and owners. At step 618, Chief Information Security Officer 613 defines identity, password, and role management standards. At step 619, Chief Information Security Officer 613 defines policies and standards for identities, access provisioning, and reporting. At step 620, Chief Information Security Officer 613 defines a corporate identity directory and entitlement management integration standards. At step 622, Chief Information Security Officer 613 performs a periodic policy review.

In the embodiment shown, new hire IPF 624 includes steps 625-635. At step 625, Human Resources Department 603 verifies an identity for employee 604 and enters that identity in the human resources system. At step 626, Incident Manager 606 opens a service request and at step 627 an identity is automatically allocated for employee 604. At step 628, following steps 625-627, Facilities Department 608 enable building access for employee 604 and allocates a desk and/or other office furniture for employee 604. At step 629, Application Manager 609 approves access for employee 604. At step 630, provisioning system 611 automatically provisions an identity and access for employee 604 to networks, email, and corporate directories. At step 631, provisioning system 611 automatically provisions identities and access for employee 604 to certain business applications. At step 632, following steps 628-631, Incident Manager 606 closes the service request opened at step 626. At step 634, employee 604 obtains network and application identities and passwords. At step 635, following the completion of steps 625-634, employee 604 has the necessary identities and entitlement to perform their duties.

In the embodiment shown, new customer/partner IPF 639 includes steps 640-645. At step 640, customer/partner 601 performs a delegated user creation. At step 641, an employee of customer/partner 601 enters data via a self-serve register. At step 642, following the completion of steps 640-641, Incident Manager 606 opens a service request. In certain embodiments, the service request opened at step 642 may or may not be required by policies defined by Chief Information Security Officer 613. At step 643, Incident Manager 606 reviews and/or sets up user access for customer/partner 601. At step 644, Incident Manager 606 closes the service request opened at step 642. In certain embodiments, steps 643 and 644 are linked such that step 644 occurs automatically upon the completion of step 643. At step 645, following the completion of steps 640-644, customer/partner 601 has access to the applications.

In the embodiment shown, customer/partner change IPF 636 includes steps 637 and 638, both associated with Customer Relationship Manager 602. At step 637, Customer Relationship Manager 602 enters customer/partner 601 into the customer relationship management system. At step 638, Customer Relationship Manager 602 defines provisioning delegates for customer/partner 601.

In the embodiment shown, new application implementation IPF 647 includes process steps 648-656. At step 648, Development Manager 614 develops and/or acquires a new application. At step 649, Development Manager 614 validates the new application with identity and password standards. At step 650, Development Manager 614 validates the new application using directory services. At step 651, Development Manager 614 validates the new application with role standards. At step 652, Development Manager 614 validates the new application with provisioning system. At step 653, Development Manager 614 produces an operations manual for the new application. At step 654, Security Manager 612 provides a workflow for security review of the new application. At step 655, Application Manager 609 provides for the integration of the new application with the production directory services. At step 656, Application Manager 609 manages the security for the new application.

In the embodiment shown, employee access change IPF includes steps 657-664. At step 657, employee 604 requests a change in application access for a new project. At step 658, Business Manager 605 approves the change in application access requested at step 657. At step 659, Incident Manager 606 opens a service request. At step 660, Application Manager 609 approves the access change requested. At step 661, in response to the approval at step 660, provisioning system 611 automatically enables the requested access. Following the completion of steps 659-661, at step 662, the requested access has been changed. At step 663, Incident Manager 606 closes the service request opened at step 659. In certain embodiments, one or more of steps 659-663 are linked and/or automated such that the subsequent step is initiated upon the completion of the previous step. At step 664, employee 604 has the requested application access.

In the embodiment shown, customer/partner access change IPF includes steps 667-669 and 659-663. At step 667, a delegated request for a change in application access for customer/partner 601 is provided. At step 668, Customer Relationship Manager 602 approves delegated request 667. In certain embodiments step 668 may or may not be required by one or more policies defined by Chief Information Security Officer 613. At step 659, Incident Manager 606 opens a service request. At step 660, Application Manager 609 approves application access for customer/partner 601. At step 661, in response to approval 660, provisioning system 611 automatically enables application access for customer/partner 601. At step 662, following the completion of steps 659-661, customer/partner 601's application access has been changed. At step 663, Incident Manager 606 closes the service request opened at step 659. At step 669, following the completion of steps 659-663, customer/partner 601 has access to the requested applications.

In the embodiment shown, employee password reset IPF includes steps 670-674. At step 670, employee 604 initiates a self-serve password reset procedure. At step 671, Incident Manager 606 opens a service request. At step 672, Incident Manager 606 resets the password for employee 604. In certain embodiments, steps 671 and 672 are linked and step 672 may be performed automatically upon the completion of step 671. At step 673, Incident Manager 606 closes the service request opened at step 671. At step 674, following the completion of steps 670-673, employee 604 has a new password as needed.

In the embodiment shown, customer/partner password reset IPF includes steps 675-676 and 671-673. At step 675, customer/partner 601 initiates a self-serve password reset procedure. At step 671, Incident Manager 606 opens service request. At step 672, Incident Manager 606 resets the password for customer/partner 601. In certain embodiments, steps 671 and 672 are linked and step 672 may be performed automatically upon the completion of step 671. At step 673, Incident Manager 606 closes the service request opened at step 671. At step 676, following the completion of steps 671-673, customer/partner 601 has the new password as needed.

Entitlement synchronization IPF 677 includes steps 678-688. At step 678, Human Resources Department 603 automatically provides a list of employees from the human resources system. At step 679, provisioning system 611 provides an automated synchronization process that compares authoritative user and role lists with network and application user accounts. If at step 680, it is determined that there are excess entitlements or ghost accounts, then at step 682 provisioning system 611 requests remediation. At step 683, in response to remediation request 682, Incident Manager 606 opens a service request. If the excess entitlements identified at step 680 is determined to include excess building access at step 684, then Facilities Department 608 initiates a work flow to revoke that excess building access at step 685. At step 686, provisioning system 611 provides an automated process to deprovision the ghost user from appropriate systems and/or applications. At step 687, following the completion of steps 684-686, the excess entitlements or ghost accounts identified at step 680 are deprovisioned. At step 688, Incident Manager 606 closes the service request opened at step 683. At step 681, provisioning system 611 automatically generates entitlements exceptions reports.

In the embodiment shown, customer relationship manager 602 and business manager 605 periodically review and/or approve user access at steps 665 and 666 respectively to update the contractor and employee lists. Following approval of user access in steps 665 and 666, provisioning system 611 provides an automated synchronization process that compares authoritative user and role lists with network and application user accounts, at step 679. Following step 679, and depending upon the determination made in step 680, one or more of steps 681-688 are performed, as described above.

In the embodiment shown, periodic security audit IPF 689 includes steps 690-692. At step 690, provisioning system 611 automatically generates change reports. At step 691, Chief Information Security Officer 613 reviews current changes reports and exceptions reports. At step 692, the audit reports are completed by Chief Information Security Officer 613.

In the embodiment shown, employee termination IPF includes steps 693-695 and 683-688. At step 693, Human Resources Department 603 terminates employee 604. At step 694, Human Resources Department 603 removes employee 604 from the human resources system. At step 683, Incident Manager 606 opens a service request. At step 683, Incident Manager 606 opens a service request. If the employee 604 is determined to have building access at step 684, then Facilities Department 608 initiates a work flow to revoke that excess building access at step 685. At step 686, provisioning system 611 provides an automated process to deprovision employee 604 from appropriate systems and/or applications. At step 687, following the completion of steps 684-686, employee 604's identities and entitlements are deprovisioned. At step 688, Incident Manager 606 closes the service request opened at step 683. At step 695, following the completion of steps 683-688, employee 604's access has been removed.

In the embodiment shown, customer/partner removal IPF includes steps 696-698 and 683-688. At step 696, customer/partner 601 no longer needs access to certain applications. At step 697, a delegated request for removal of access to the certain applications is generated by a manager of customer/partner 601. At step 683, Incident Manager 606 opens a service request. At step 683, Incident Manager 606 opens a service request. If the customer/partner 601 has is determined to have building access at step 684, then Facilities Department 608 initiates a work flow to revoke that excess building access at step 685. At step 686, provisioning system 611 provides an automated process to deprovision customer/partner 601 from appropriate systems and/or applications. At step 687, following the completion of steps 684-686, customer/partner 601's identities and entitlements are deprovisioned. At step 688, Incident Manager 606 closes the service request opened at step 683. At step 698, following the completion of steps 683-688, customer/partner 601's access has been removed for those certain applications.

FIGS. 12A-12F provide an example graphical tool, shown here as identity management process flow diagram 700, illustrating certain aspects of an example business-driven identity management system, according to particular embodiments. In the embodiment shown, business-driven identity management process flow diagram 700 represents processes and activities that affect or are affected by twelve different functional entities—customer/partner 701, Customer Relationship Manager 702, Human Resources Department 703, employee 704, Business Manager 705, Incident Manager 706, Facilities Department 708, Application Manager 709, provisioning system 711, Security Manager 712, Chief Information Security Officer 713, and Development Manager 714. In the embodiment shown, business-driven identity management process flow diagram 700 includes thirteen distinct, but not necessarily independent, IPFs. These IPFs include aspects of employee life cycle 60, software implementation cycle 70, and audit cycle 80. These IPFs include define policies and standards IPF 716, new hire IPF 724, new customer/partner IPF 739, and new application implementation IPF 747. Business-driven identity management process flow diagram 700 also includes employee access change IPF, customer/partner access change IPF, employee password reset IPF, customer/partner password reset IPF, entitlements synchronization IPF 776, periodic security audit IPF 789, employee termination IPF, and terminating customer/partner access IPF.

In the embodiment shown, define policies and standards IPF 716 includes steps 717-722. At step 717, Chief Information Security Officer 713 defines integrated access management (IAM) policies, processes, workflows, and owners. At step 718, Chief Information Security Officer 713 defines standards for identities, passwords, and role management. At step 719, Chief Information Security Officer 713 defines policies and standards for identity provisioning and reporting. At step 720, Chief Information Security Officer 713 defines corporate identity directory entitlement management and web services security. At step 721, Chief Information Security Officer 713 defines federated trust standards. At step 722, Chief Information Security Officer 713 performs a periodic policy review.

In the embodiment shown, new hire IPF 724 includes steps 725-734. At step 725, Human Resources Department 703 verifies an identity for employee 704 and enters that identity in the human resources system. At step 726, Incident Manager 706 opens a service request. At step 727, Incident Manager 706 automatically allocates an identity in response to the opened service request. At step 728, following steps 726 and 727, Facilities Department 708 automatically provisions building access for employee 704. At step 729, Application Manager 709 approves access for employee 704. At step 730, provisioning system 711 automatically provisions identities and accesses for networks, email, corporate directories, authentication technologies, security web services, access management, and/or external federated services as appropriate. At step 731, following the completion of step 729, provisioning system 711 automatically provisions identities and accesses to appropriate business applications. At step 732, following the completion of steps 728-731, Incident Manager 706 closes the service request opened at step 726. At step 734, employee 704 obtains network and application identities and passwords. At step 735, following the completion of steps 725-734, employee 704 has the necessary identities and entitlements to perform their duties.

In the embodiment shown, new customer/partner IPF 739 includes steps 740-746. At step 740, customer/partner 701 initiates an SPML request. At step 741, customer/partner 701 performs a delegated user creation. At step 742, an employee of customer/partner 701 enters data via a self-serve register. At step 743, Incident Manager 706 opens a service request. In certain embodiments, the service request opened at step 743 may or may not be required by policies defined by Chief Information Security Officer 713. At step 744, Incident Manager 706 reviews and/or sets up user access for customer/partner 701. At step 745, Incident Manager 706 closes the service request opened at step 743. In certain embodiments, steps 744 and 745 are linked such that step 745 occurs automatically upon the completion of step 744. At step 746, following the completion of steps 740-745, authorized employees of customer/partner 701 have access to appropriate applications.

In the embodiment shown, customer/partner change IPF 735 includes steps 736-738, all associated with Customer Relationship Manager 702. At step 736, Customer Relationship Manager 702 enters customer/partner 701 into the customer relationship management system. At step 737, Customer Relationship Manager 702 defines and/or removes provisioning delegates. At step 738, Customer Relationship Manager 702 initiates a federated trust change request.

In the embodiment shown, new application implementation IPF 747 includes steps 748-757. At step 748, Development Manager 714 develops and/or acquires a new application. At step 749, Development Manager 714 validates the new application with identity and password standards. At step 750, Development Manager 714 validates the new application using directory services. At step 751, Development Manager 714 validates the new application with role standards. At step 752, Development Manager 714 validates the new application with the provisioning system. At step 753, Development Manager 714 validates the new application with SPML. At step 754, Development Manager 714 produces an operations manual for the new application. At step 755, Security Manager 712 provides a workflow for security review of the new application. At step 756, Application Manager 709 provides for the integration of the new application with the production directory services and security web services. At step 757, Application Manager 709 manages the security for the new application. In the embodiment shown, any configuration management database (CMDB) changes made by Incident Manager 706 that impact application deployment, ownership, access, etc., are communicated to Application Manager 709 so that Application Manager 709 may account for these changes in the management of the new application security at step 757.

In the embodiment shown, employee access change IPF includes steps 758-765. At step 758, employee 704 requests a change in application access for a new project. At step 759, Business Manager 705 approves the change in application access requested at step 758. At step 760, Incident Manager 706 opens a service request. At step 761, Application Manager 709 approves the requested change in application access. At step 762, following the completion of step 761, provisioning system 711 automatically enables the requested access. At step 763, following the completion of steps 760-762, the requested application access has been changed. At step 764, Incident Manager 706 closes the service request opened at step 760. In certain embodiments, one or more of steps 759-764 are linked and/or automated such that the subsequent step is initiated upon the completion of the previous step. At step 765, employee 704 has the requested application access.

In the embodiment shown, customer/partner access change IPF includes steps 766-768 and 760-764. At step 766, a delegated request for a change in application access for customer/partner 701 is provided. At step 767, Customer Relationship Manager 702 approves delegated request 766. In certain embodiments, step 767 may or may not be required by one or more policies defined by Chief Information Security Officer 713. At step 760, Incident Manager 706 opens a service request. At step 761, Application Manager 709 approves the access change requested. At step 762, in response to the approval at step 761, provisioning system 711 automatically enables the requested access. At step 763, following the completion of steps 760-762, the requested access has been changed. At step 764, Incident Manager 706 closes the service request opened at step 760. At step 768, following the completion of steps 760-764, customer/partner 701 has access to the requested applications.

In the embodiment shown, employee password reset IPF includes steps 769-773. At step 769, employee 704 initiates a self-serve password reset procedure. At step 770, Incident Manager 706 opens a service request. At step 771, Incident Manager 706 resets the password for employee 704. In certain embodiments, steps 770 and 771 are linked and step 771 may be performed automatically upon the completion of step 770. At step 772, Incident Manager 706 closes the service request opened at step 770. At step 773, following the completion of steps 769-772, employee 704 has a new password as needed.

In the embodiment shown, customer/partner password reset IPF includes steps 774-775 and 770-772. At step 774, customer/partner 701 initiates a self-serve password reset procedure. At step 770, Incident Manager 706 opens a service request. At step 771, Incident Manager 706 resets the password for customer/partner 701. In certain embodiments, steps 770 and 771 are linked and step 771 may be performed automatically upon the completion of step 770. At step 772, Incident Manager 706 closes the service request opened at step 770. At step 775, following the completion of steps 770-772, customer/partner 701 has the new password as needed.

Entitlement synchronization IPF 776 includes steps 789-788. At step 789, Human Resources Department 703 automatically provides a list of employees from the human resources system. At step 780, provisioning system 711 provides an automated synchronization process that compares authoritative user and role lists with network and application user accounts. If at step 781 it is determined that there are excess entitlements or ghost accounts, then at step 783 provisioning system 711 requests remediation. At step 784, in response to remediation request 783, Incident Manager 706 opens a service request. If the excess entitlements identified at step 781 is determined to include excess building access, then at step 785 Facilities Department 708 initiates a process to automatically deprovision the excess facilities access for that user. At step 786, provisioning system 711 provides an automated process to deprovision the ghost user from appropriate systems and/or applications. At step 787, following the completion of steps 785 and 786, the excess entitlements or ghost accounts identified at step 781 are deprovisioned. At step 788, Incident Manager 706 closes the service request opened at step 784. At step 782, provisioning system 711 automatically generates entitlement exceptions reports.

In the embodiment shown, customer relationship manager 702 and business manager 705 periodically review and/or approve user access at steps 777 and 778 respectively to update the contractor and employee lists. Following approval of user access in steps 777 and 778, provisioning system 711 provides an automated synchronization process that compares authoritative user and role lists with network and application user account, at step 780. Following step 780, and depending upon the determination made in step 781, one or more of steps 782-788 are performed, as described above.

In the embodiment shown, periodic security audit IPF 789 includes steps 790-792. At step 790, provisioning system 711 automatically generates change reports. At step 791, Chief Information Security Officer 713 reviews current change reports and exception reports. At step 792, the audit reports are completed by Chief Information Security Officer 713.

In the embodiment shown, employee termination IPF includes steps 793-795 and 784-788. At step 793, Human Resources Department 703 terminates employee 704. At step 794, Human Resources Department 703 removes employee 704 from the human resources system. At step 784, Incident Manager 704 opens a service request. At step 785, Facilities Department 708 initiates an automated process to deprovision employee 704 from facilities access. At step 786, provisioning system 711 initiates an automated process to deprovision employee 704 from entitlements to systems and applications. At step 787, following the completion of steps 785 and 786, employee 704 has been deprovisioned. At step 788, following the completion of step 787, Incident Manager 706 closes the service request opened at step 784. At step 795, following the completion of steps 784-788, employee 704's access has been removed.

In the embodiment shown, customer/partner removal IPF includes steps 796-798 and 784-788. At step 796, customer/partner 701 no longer needs access to certain applications. At step 797, a delegated request for removal of access to the certain applications is generated by a manager of customer/partner 701. At step 784, Incident Manager 706 opens a service request. At step 785, Facilities Department 708 initiates an automated process to deprovision customer/partner 701 from facilities access if needed. At step 786, provisioning system 711 initiates an automated process to deprovision customer/partner 701 from appropriate systems and applications as needed. At step 787, following the completion of steps 785 and 786, customer/partner 701 has been deprovisioned. At step 788, following the completion of step 787, Incident Manager 706 closes the service request opened at step 784. At step 798, following the completion of steps 784-788, customer/partner 701's access has been removed for those certain applications.

Figure 13:
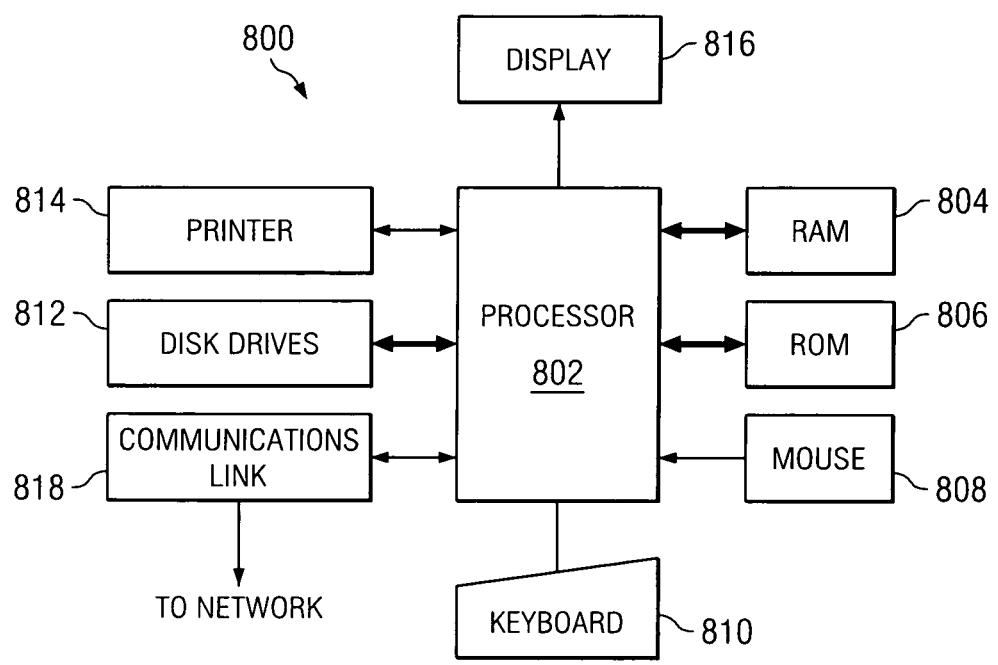
FIG. 13 is a block diagram illustrating an embodiment of a general purpose computer.

FIG. 13 illustrates an embodiment of a general purpose computer 800 that may be used in connection with one or more pieces of software used to implement the invention.

General purpose computer 800 may generally be adapted to execute any of the well-known OS2, UNIX, Mac-OS, Linux, and Windows Operating Systems or other operating systems. In certain embodiments, general purpose computer 800 may include one or more processing modules, one or more memory modules, and/or one or more output devices. The general purpose computer 800 in this embodiment comprises a processor 802, a random access memory (RAM) 804, a read only memory (ROM) 806, a mouse 808, a keyboard 810 and input/output devices such as a printer 514, disk drives 812, a display 816 and a communications link 818. In other embodiments, the general purpose computer 800 may include more, less, or other component parts. Embodiments of the present invention may include programs that may be stored in the RAM 804, the ROM 806 or the disk drives 812 and may be executed by the processor 802. The communications link 618 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 812 may include a variety of types of storage media such as, for example, floppy disk drives, hard disk drives, CD ROM drives, DVD ROM drives, magnetic tape drives or other suitable storage media.

Although FIG. 13 provides one embodiment of a computer that may be used with the invention, the invention may additionally utilize computers other than general purpose computers as well as general purpose computers without conventional operating systems. Additionally, embodiments of the invention may also employ multiple general purpose computers 800 or other computers networked together in a computer network. Most commonly, multiple general purpose computers 800 or other computers may be networked through the Internet and/or in a client server network. Embodiments of the invention may also be used with a combination of separate computer networks each linked together by a private or a public network.

Several embodiments of the invention may include logic contained within a medium. In the embodiment of FIG. 13, the logic comprises computer software executable on the general purpose computer 800. The medium may include the RAM 804, the ROM 806 or the disk drives 812. In other embodiments, the logic may be contained within hardware configurations or a combination of software and hardware configurations. The logic may also be embedded within any other suitable medium without departing from the scope of the invention.

Although the present invention has been described with several embodiments, a plenitude of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. Software for use in implementing an identity management system for an organization, the software embodied in a non-transitory computer-readable medium and when executed using one or more processors, operable to:
generate a graphical process flow diagram comprising:
one or more icons representing at least one process step for each of the events included in an event group, the event group comprising:
a status change for a system user;
a request for an audit report; and
an implementation of a new software application; and
monitor the completion status of one or more process steps represented within the graphical process flow; and
update the graphical process flow to indicate a completion status of one or more process steps represented within the graphical process flow.

2. The software of claim 1, wherein the graphical process flow diagram further comprises:
one or more icons representing at least one process step for each of the functional entities in an entity group, the entity group comprising:
a human resources department;
an information technologies department; and
a facilities department.

3. The software of claim 2, wherein the entity group further comprises:
the system user; and
a supervisor of the system user.

4. The software of claim 2, wherein the entity group further comprises:
a customer of the organization; and
a customer relationship manager.

5. The software of claim 2, wherein at least one functional entity within the entity group comprises a vendor.

6. The software of claim 1, wherein the system user comprises an employee of the organization.

7. The software of claim 6, wherein the status change for the system user comprises a change in employment status.

8. The software of claim 1, wherein the status change for the system user comprises a change in responsibilities for the system user.

9. The software of claim 1, wherein the information technologies department comprises a functional entity responsible for developing new software applications and for managing existing software applications within the organization.

10. Software for use in implementing an identity management system for an organization, the software embodied in a non-transitory computer-readable medium and when executed using one or more processors, operable to:
generate a graphical process flow diagram comprising:
one or more icons representing at least one process step for each of the events included in an event group, the event group comprising:
a status change for a system user;
a request for an audit report; and
an implementation of a new software application;
receive information indicating that a first process step has been completed;
identify a second process step that should be completed subsequent to the completion of the first process step; and
generate a notice to inform a functional entity, associated with the second process step, that the second process step should be completed.

11. The software of claim 10, wherein the graphical process flow diagram further comprises:
one or more icons representing at least one process step for each of the functional entities in an entity group, the entity group comprising:
a human resources department;
an information technologies department; and
a facilities department.

12. The software of claim 11, wherein the entity group further comprises:
the system user; and
a supervisor of the system user.

13. The software of claim 11, wherein the entity group further comprises:
- a customer of the organization; and
- a customer relationship manager.

14. The software of claim 11, wherein at least one functional entity within the entity group comprises a vendor.

15. The software of claim 10, wherein the system user comprises an employee of the organization.

16. The software of claim 15, wherein the status change for the system user comprises a change in employment status.

17. The software of claim 10, wherein the status change for the system user comprises a change in responsibilities for the system user.

18. The software of claim 10, wherein the information technologies department comprises a functional entity responsible for developing new software applications and for managing existing software applications within the organization.

19. A system for use in implementing an identity management system for an organization, the system comprising:
- one or more memory modules;
- one or more processing modules operable to:
  - generate a graphical process flow diagram comprising:
    - one or more icons representing at least one process step for each of the events included in an event group, the event group comprising:
      - a status change for a system user;
      - a request for an audit report; and
      - an implementation of a new software application;
  - monitor the completion status of one or more process steps represented within the graphical process flow; and
  - update the graphical process flow to indicate a completion status of one or more process steps represented within the graphical process flow; and
- one or more output devices operable to display the graphical process flow diagram.

20. The system of claim 19, wherein the graphical process flow diagram further comprises:
- one or more icons representing at least one process step for each of the functional entities in an entity group, the entity group comprising:
  - a human resources department;
  - an information technologies department; and
  - a facilities department.

21. The system of claim 20, wherein the entity group further comprises:
- the system user; and
- a supervisor of the system user.

22. The system of claim 20, wherein the entity group further comprises:
- a customer of the organization; and
- a customer relationship manager.

23. The system of claim 20, wherein at least one functional entity within the entity group comprises a vendor.

24. The system of claim 19, wherein the system user comprises an employee of the organization.

25. The system of claim 24, wherein the status change for the system user comprises a change in employment status.

26. The system of claim 19, wherein the status change for the system user comprises a change in responsibilities for the system user.

27. The system of claim 19, wherein the information technologies department comprises a functional entity responsible for developing new software applications and for managing existing software applications within the organization.

28. The system of claim 19, wherein the one or more output devices comprise a computer monitor.

29. A method implementing an identity management system for an organization, comprising:
- generating, using one or more processing modules, a graphical process flow diagram comprising one or more icons representing at least one process step for each of the events included in an event group, the event group comprising:
  - a status change for a system user;
  - a request for an audit report; and
  - an implementation of a new software application;
- monitoring, using one or more processing modules, the completion status of one or more process steps represented within the graphical process flow; and
- updating, using one or more processing modules, the graphical process flow to indicate a completion status of one or more process steps represented within the graphical process flow.

30. The method of claim 29, wherein the graphical process flow diagram further comprises one or more icons representing at least one process step for each of the functional entities in an entity group, the entity group comprising:
- a human resources department;
- an information technologies department; and
- a facilities department.

31. The method of claim 30, wherein the entity group further comprises:
- the system user; and
- a supervisor of the system user.

32. The method of claim 30, wherein the entity group further comprises:
- a customer of the organization; and
- a customer relationship manager.

33. The method of claim 30, wherein at least one functional entity within the entity group comprises a vendor.

34. The method of claim 29, wherein the system user comprises an employee of the organization.

35. The method of claim 34, wherein the status change for the system user comprises a change in employment status.

36. The method of claim 29, wherein the status change for the system user comprises a change in responsibilities for the system user.

* * * * *